(12) United States Patent
You et al.

(10) Patent No.: US 12,557,077 B2
(45) Date of Patent: Feb. 17, 2026

(54) METHOD FOR OPERATING IAB NODE IN WIRELESS COMMUNICATION SYSTEM, AND DEVICE USING METHOD

(71) Applicant: LG ELECTRONICS INC., Seoul (KR)

(72) Inventors: Hyangsun You, Seoul (KR); Hyunsoo Ko, Seoul (KR); Haewook Park, Seoul (KR); Jaenam Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 18/019,753

(22) PCT Filed: Aug. 6, 2021

(86) PCT No.: PCT/KR2021/010423
§ 371 (c)(1),
(2) Date: Feb. 3, 2023

(87) PCT Pub. No.: WO2022/031114
PCT Pub. Date: Feb. 10, 2022

(65) Prior Publication Data
US 2023/0309067 A1    Sep. 28, 2023

Related U.S. Application Data

(60) Provisional application No. 63/063,195, filed on Aug. 7, 2020.

(30) Foreign Application Priority Data

Oct. 23, 2020  (KR) .......................... 10-2020-0138188
Jan. 15, 2021  (KR) .......................... 10-2021-0005816

(51) Int. Cl.
H04W 88/08    (2009.01)
H04W 72/044   (2023.01)
H04W 72/232   (2023.01)

(52) U.S. Cl.
CPC ....... H04W 72/044 (2013.01); H04W 72/232 (2023.01); *H04W 88/085* (2013.01)

(58) Field of Classification Search
CPC . H04W 72/044; H04W 72/232; H04W 84/04; H04W 72/27; H04W 88/085
See application file for complete search history.

(56) References Cited

U.S. PATENT DOCUMENTS

2019/0350023 A1    11/2019  Novlan et al.
2021/0058970 A1*   2/2021   Kwak ................... H04W 72/23
(Continued)

FOREIGN PATENT DOCUMENTS

WO    2019/194737 A1    10/2019

OTHER PUBLICATIONS

CMCC, "Remaining issues on mechanisms for resource multiplexing among backhaul and access links," 3GPP TSG RAN WG1 #100bis, R1-2002203, 3 pages, Apr. 2020.
(Continued)

*Primary Examiner* — Andrew Lee
(74) *Attorney, Agent, or Firm* — BRYAN CAVE LEIGHTON PAISNER LLP

(57) ABSTRACT

Provided are a method and device for operating an IAB node including an MT and a DU in a wireless communication system. The method involves receiving first slot format information, time domain HSNA information, and frequency domain HSNA information about the DU, receiving second slot format information about the MT, and determining operation resources of the MT and the DU on the basis of at least one of the first slot format information, the time
(Continued)

domain HSNA information, the frequency domain HSNA information, and the second slot format information. Whether to apply the frequency domain HSNA information may be determined according to whether a slot supports the simultaneous operation of the MT and the DU. In addition, provided are a method and device for notifying availability information about soft resources in a time domain and availability information about soft resources in a frequency domain by using an existing DCI format.

14 Claims, 29 Drawing Sheets

(56) References Cited

U.S. PATENT DOCUMENTS

| | | | | |
|---|---|---|---|---|
| 2021/0243782 | A1* | 8/2021 | Miao | H04L 5/0091 |
| 2022/0217661 | A1* | 7/2022 | Yokomakura | H04B 7/155 |
| 2022/0279511 | A1* | 9/2022 | Kowalski | H04W 72/20 |
| 2022/0338173 | A1* | 10/2022 | Zheng | H04W 72/0446 |
| 2023/0345555 | A1* | 10/2023 | Kurita | H04W 92/20 |

OTHER PUBLICATIONS

Moderator (AT&T), "Summary of Mechanisms for resource multiplexing among backhaul and access links," 3GPP TSG-RAN WG1, R1-2004281, 22 pages, Jun. 2020.

Nokia et al., "Maintenance of Rel-16 IAB Resource Multiplexing", R1-2000797, 3GPP TSG RAN WG1 Meeting #100, e-Meeting, Feb. 24-Mar. 6, 2020, see section 2.

Huawei et al., "Corrections on resource multiplexing among backhaul and access links", R1-2001038, 3GPP TSG RAN WG1 Meeting #100-e, Feb. 24-Mar. 6, 2020, see sections 2.1-2.4.

Ericsson, "Mechanisms for resource multiplexing among backhaul and access links", R1-2004582, 3GPP TSG-RAN WG1 Meeting #101e, e-Meeting, May 25-Jun. 5, 2020, see sections 2.1-2.2.

Moderator (AT&T)(2020), "Summary of [100b-e-NR-IAB-03] regarding IAB Operation in Paired Spectrum," 3GPP TSG-RAN WG1 Meeting #100bis-e, e-Meeting, Apr. 20-30, 2020, R1-2002803, 8 pages.

Intel Coproation (2020), "Discussion on Soft Resource Availability Indication," 3GPP TSG RAN WG1 #101e, e-Meeting, May 25-Jun. 5, 2020, R1-3002732, pp. 1-3.

* cited by examiner

FIG. 16
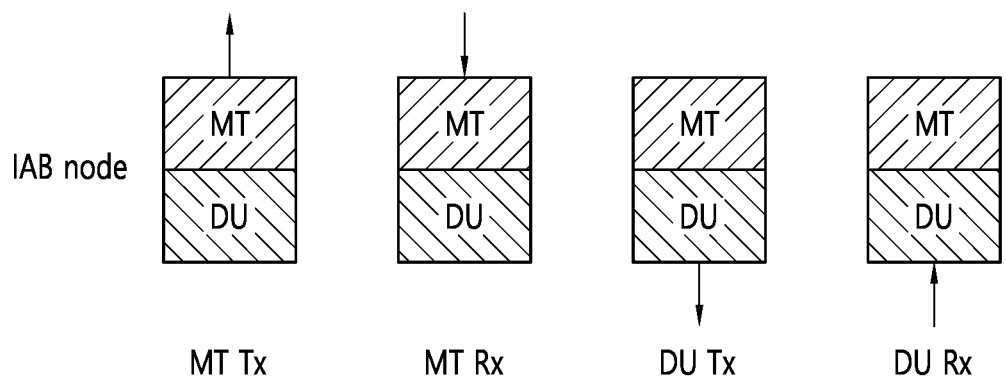
(a)
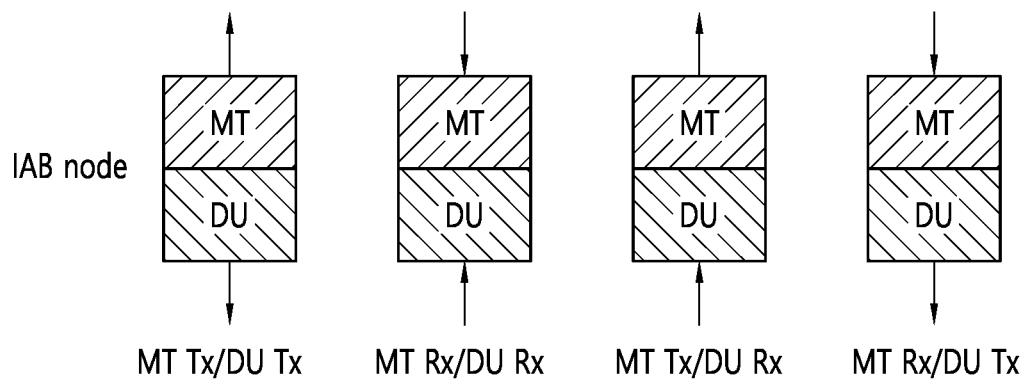
(b)

METHOD FOR OPERATING IAB NODE IN WIRELESS COMMUNICATION SYSTEM, AND DEVICE USING METHOD

CROSS REFERENCE TO RELATED APPLICATIONS

This application is the National Stage filing under 35 U.S.C. 371 of International Application No. PCT/KR2021/010423, filed on Aug. 6, 2021, which claims the benefit of U.S. Provisional Application No. 63/063,195, filed on Aug. 7, 2020, Korean Patent Application No. 10-2020-0138188, filed on Oct. 23, 2020 and Korean Patent Application No. 10-2021-0005816, filed on Jan. 15, 2021, the contents of which are all hereby incorporated by reference herein in their entirety.

BACKGROUND OF THE DISCLOSURE

Field of the Disclosure

The present disclosure relates to an operating method of an IAB node in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, massive MIMO or multi-beam may be used, and a very large bandwidth is expected to be available compared to LTE, and the development and deployment of integrated access and backhaul (IAB) nodes is also expected.

An IAB node may be a node that supports a wireless connection with a terminal/other node like a repeater based on a wireless backhaul (connection with a parent node or a donor node) supporting multi-hop. The IAB node may include a distributed unit (DU) and a mobile terminal (MT). Here, the DU may be a part that provides a connection to a terminal or other IAB node, and the MT may be a part that provides a connection to a parent node or a donor node. The DU may play the same/similar role as the base station for the terminal or other node, and the MT may play the same/similar role as the terminal for a parent node or a donor node.

The IAB node may have to determine who will use the soft resource among the MT and the DU. Here, the soft resource is a resource that can be preferentially used by the MT of the IAB node. When availability information on the soft resource is detected, the soft resource may be a resource that can be preferentially used by the DU of the IAB node. Availability information was provided through a specific downlink control information (DCI) format transmitted through a physical downlink control channel (PDCCH), for example, DCI format 2_5.

The IAB node may not support the simultaneous operation of the MT and the DU. In this case, for example, the MT and the DU may operate in time division multiplexing (TDM), and it may be sufficient to inform only the time domain of H/S/NA information indicating whether a specific resource is hard, soft, or unavailable (NA). H/S/NA information may be provided through a higher layer signal.

However, a specific IAB node may also support simultaneous operation of the MT and the DU, and for the simultaneous operation, it may be considered that the MT and the DU operate by frequency division multiplexing (FDM) in a specific duration. In this case, it is not sufficient to inform the H/S/NA information only in the time domain, and it may be necessary to inform the frequency domain as well. Hereinafter, H/S/NA information for the time domain will be referred to as time domain H/S/NA information, and H/S/NA information for the frequency domain will be referred to as frequency domain H/S/NA information.

When time domain H/S/NA information and frequency domain H/S/NA information are provided, it is necessary to specify which of the two H/S/NA information the specific IAB node will operate based on.

In addition, it is necessary to define in what manner availability information is provided for the soft resource set by the frequency domain H/S/NA information.

SUMMARY OF THE DISCLOSURE

An object of the present disclosure is to provide an operating method of an IAB node, and an apparatus using the method.

In one aspect, provided is a method of operating an integrated access and backhaul (IAB) node including a mobile terminal (MT) and a distributed unit (DU) in a wireless communication system. The method includes receiving first slot format information, time domain HSNA information, and frequency domain HSNA information for the DU, receiving second slot format information for the MT, determining operation resources of the MT and the DU based on at least one of the first slot format information, the time domain HSNA information, the frequency domain HSNA information, and the second slot format information. Each of the first slot format information and the second slot format information informs a downlink symbol, an uplink symbol, and a flexible symbol in a slot. The time domain HSNA information informs that a symbol, which is a time resource in the slot, is configured as hard (H), soft (S), or unavailable (NA). The frequency domain HSNA information informs that a frequency resource in the slot is configured as hard, soft or unavailable. Based on the slot supporting a simultaneous operation of the MT and the DU, the operation resources of the MT and the DU are determined with applying the frequency domain HSNA information. And based on the slot not supporting the simultaneous operation of the MT and the DU, the operation resources of the MT and the DU are determined without applying the frequency domain HSNA information.

In another aspect, provided is an integrated access and backhaul (IAB) node including a mobile terminal (MT) and a distributed unit (DU). The IAB node includes a transceiver, at least one memory and at least one processor operatively coupled with the at least one memory and the transceiver. The processor is configured to: receive first slot format information, time domain HSNA information, and frequency domain HSNA information for the DU, receive second slot format information for the MT, determine operation resources of the MT and the DU based on at least one of the first slot format information, the time domain HSNA information, the frequency domain HSNA information, and the second slot format information. Each of the first slot format information and the second slot format information informs a downlink symbol, an uplink symbol, and a flexible symbol in a slot. The time domain HSNA information informs that a symbol, which is a time resource in the slot, is configured as hard (H), soft (S), or unavailable (NA). The frequency domain HSNA information informs that a frequency resource in the slot is configured as hard, soft or unavailable. Based on the slot supporting a simultaneous operation of the MT and the DU, the operation resources of the MT and the DU are determined with applying the frequency domain HSNA information. And based on the slot not supporting the simultaneous operation of the MT and the DU, the operation resources of the MT and the DU are determined without applying the frequency domain HSNA information.

In still another aspect, provided is an apparatus. The apparatus includes at least one memory and at least one processor operatively coupled with the at least one memory. The processor is configured to: receive first slot format information, time domain HSNA information, and frequency domain HSNA information for the DU, receive second slot format information for the MT, determine operation resources of the MT and the DU based on at least one of the first slot format information, the time domain HSNA information, the frequency domain HSNA information, and the second slot format information. Each of the first slot format information and the second slot format information informs a downlink symbol, an uplink symbol, and a flexible symbol in a slot. The time domain HSNA information informs that a symbol, which is a time resource in the slot, is configured as hard (H), soft (S), or unavailable (NA). The frequency domain HSNA information informs that a frequency resource in the slot is configured as hard, soft or unavailable. Based on the slot supporting a simultaneous operation of the MT and the DU, the operation resources of the MT and the DU are determined with applying the frequency domain HSNA information. And based on the slot not supporting the simultaneous operation of the MT and the DU, the operation resources of the MT and the DU are determined without applying the frequency domain HSNA information.

In still another aspect, provided is at least one computer readable medium (CRM) having an instruction to be executed by at least one processor to perform operations includes: receiving first slot format information, time domain HSNA information, and frequency domain HSNA information for the DU, receiving second slot format information for the MT, determining operation resources of the MT and the DU based on at least one of the first slot format information, the time domain HSNA information, the frequency domain HSNA information, and the second slot format information. Each of the first slot format information and the second slot format information informs a downlink symbol, an uplink symbol, and a flexible symbol in a slot. The time domain HSNA information informs that a symbol, which is a time resource in the slot, is configured as hard (H), soft (S), or unavailable (NA). The frequency domain HSNA information informs that a frequency resource in the slot is configured as hard, soft or unavailable. Based on the slot supporting a simultaneous operation of the MT and the DU, the operation resources of the MT and the DU are determined with applying the frequency domain HSNA information. And based on the slot not supporting the simultaneous operation of the MT and the DU, the operation resources of the MT and the DU are determined without applying the frequency domain HSNA information.

In still another aspect, provided is a method of operating a parent node in a wireless communication system including the parent node connected to an integrated access and backhaul (IAB) node including a mobile terminal (MT) and a distributed unit (DU). The method includes transmitting, to the IAB node, first slot format information, time domain HSNA information, and frequency domain HSNA information for the DU, transmitting, to the IAB node, second slot format information for the MT, communicating with at least one of the MT and the DU in operation resources of the MT and the DU determined based on at least one of the first slot format information, the time domain HSNA information, the frequency domain HSNA information, and the second slot format information. Each of the first slot format information and the second slot format information informs a downlink symbol, an uplink symbol, and a flexible symbol in a slot. The time domain HSNA information informs that a symbol, which is a time resource in the slot, is configured as hard (H), soft (S), or unavailable (NA). The frequency domain HSNA information informs that a frequency resource in the slot is configured as hard, soft or unavailable. Based on the slot supporting a simultaneous operation of the MT and the DU, the operation resources of the MT and the DU are determined with applying the frequency domain HSNA information. And based on the slot not supporting the simultaneous operation of the MT and the DU, the operation resources of the MT and the DU are determined without applying the frequency domain HSNA information.

When time domain H/S/NA information and frequency domain H/S/NA information are provided, no ambiguity arises by clearly defining which of the two H/S/NA information the IAB node will operate based on.

In addition, by providing a method of informing availability information on soft resources set by frequency domain H/S/NA information using the existing DCI format 2_5, availability information for soft resources in the frequency domain may be configured without a burden of monitoring a new DCI format and without affecting the operation of a legacy terminal.

BRIEF DESCRIPTION OF THE DRAWINGS

FIG. 16 illustrates asynchronous operation and simultaneous operation.

DESCRIPTION OF EXEMPLARY EMBODIMENTS

Figure 1:
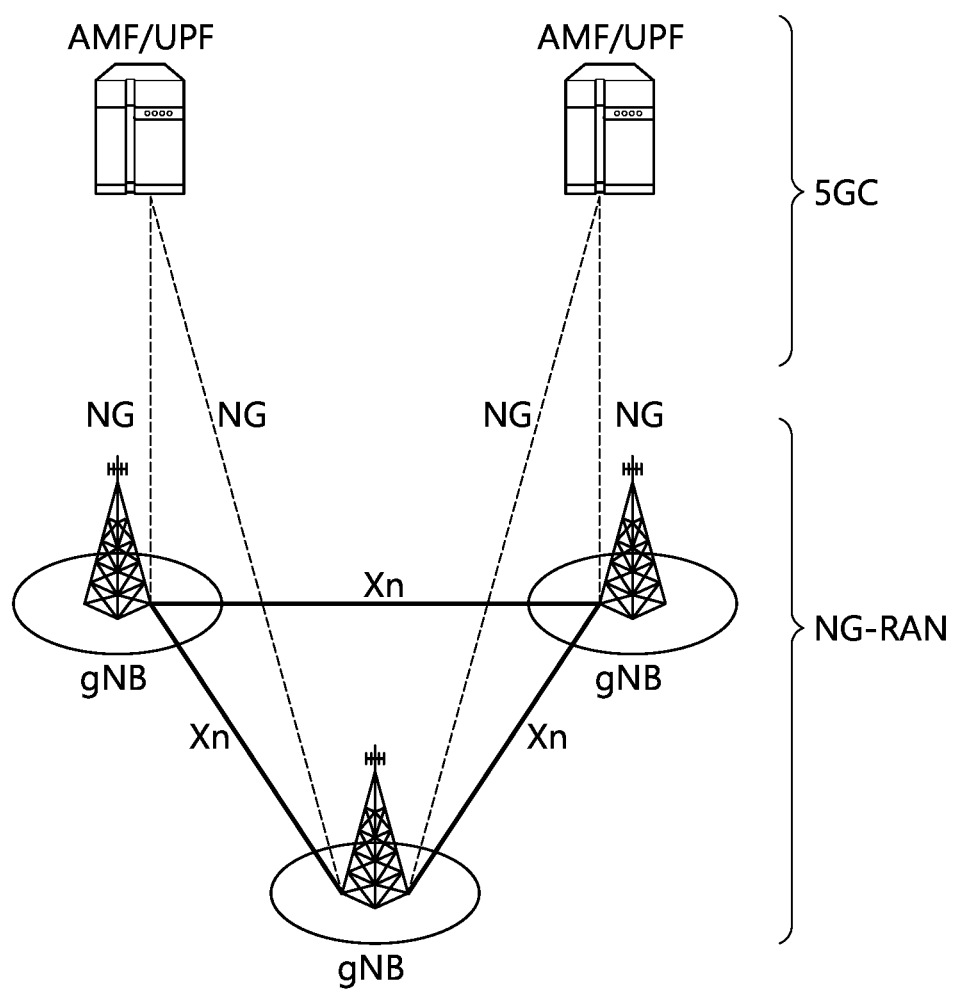
FIG. 1 illustrates a system structure of a next generation radio access network (NG-RAN) to which NR is applied.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

The following drawings were created to explain a specific example of the present specification. Since the names of specific devices described in the drawings or the names of specific signals/messages/fields are presented by way of example, the technical features of the present specification are not limited to the specific names used in the following drawings.

A conventional wireless communication system may be referred to as an Evolved-UMTS Terrestrial Radio Access Network (E-UTRAN) or a Long Term Evolution (LTE)/LTE-A system.

The E-UTRAN includes at least one base station (BS) which provides a control plane and a user plane to a user equipment (UE). The UE may be fixed or mobile, and may be referred to as another terminology, such as a mobile station (MS), a user terminal (UT), a subscriber station (SS), a mobile terminal (MT), a wireless device, etc. The BS is generally a fixed station that communicates with the UE and may be referred to as another terminology, such as an evolved node-B (eNB), a base transceiver system (BTS), an access point, etc.

The BSs are interconnected by means of an X2 interface. The BSs are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The user plane is a protocol stack for user data transmission. The control plane is a protocol stack for control signal transmission.

A PHY layer provides an upper layer (=higher layer) with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

FIG. 1 illustrates a system structure of a next generation radio access network (NG-RAN) to which NR is applied.

Figure 4:
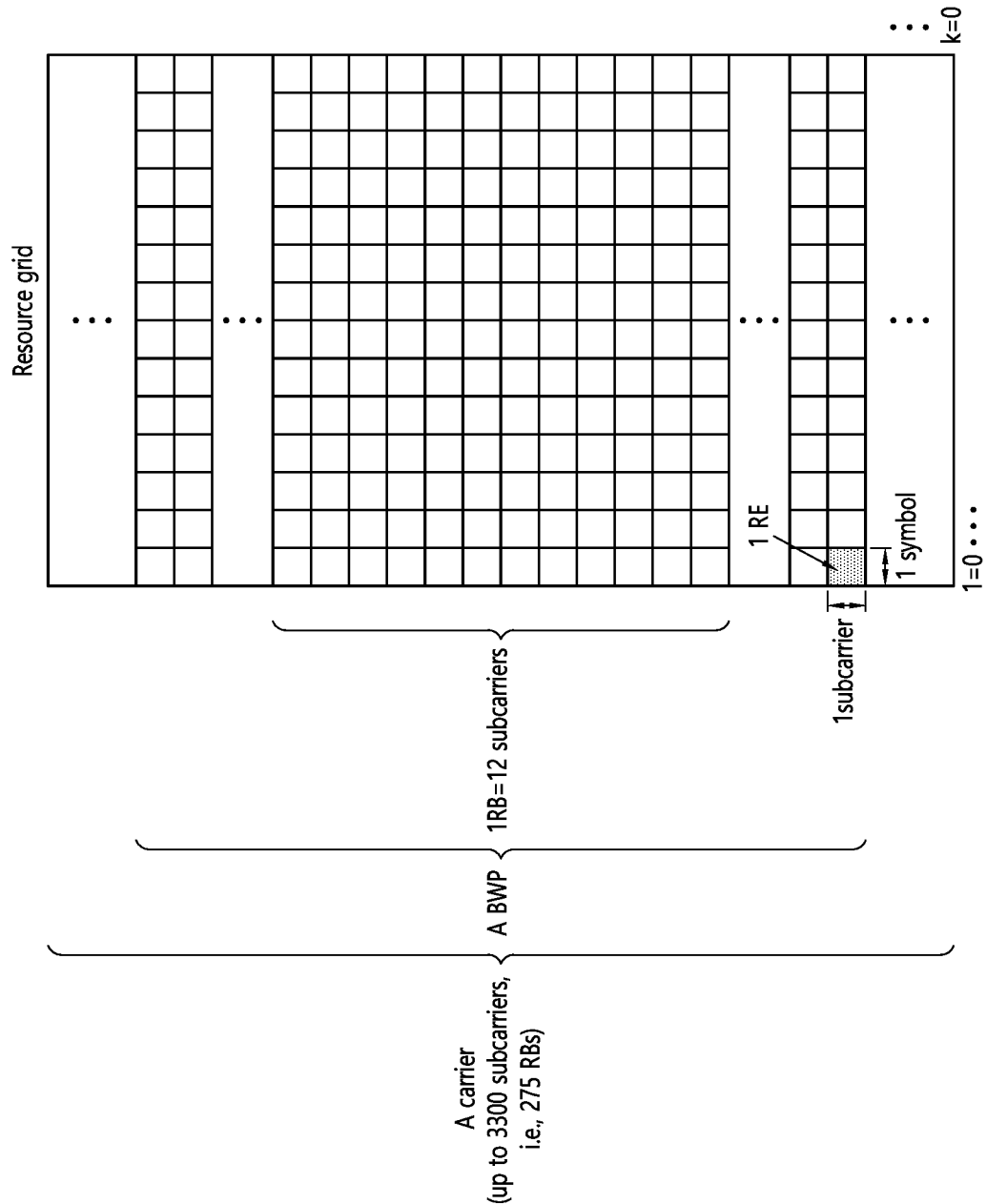
FIG. 4 illustrates a slot structure of an NR frame.

Referring to FIG. 1, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 2:
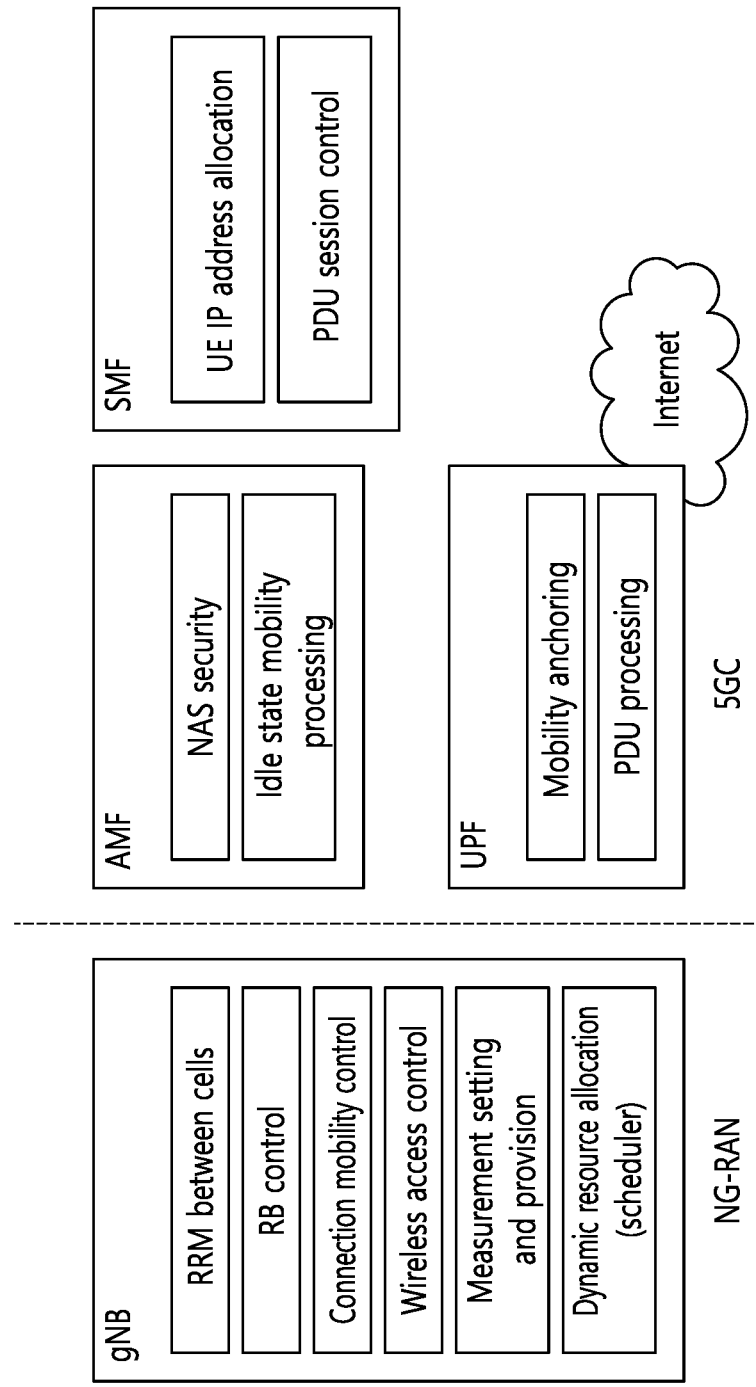
FIG. 2 illustrates a functional division between an NG-RAN and a 5GC.

FIG. 2 illustrates a functional division between an NG-RAN and a 5GC.

Referring to FIG. 2, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 3:
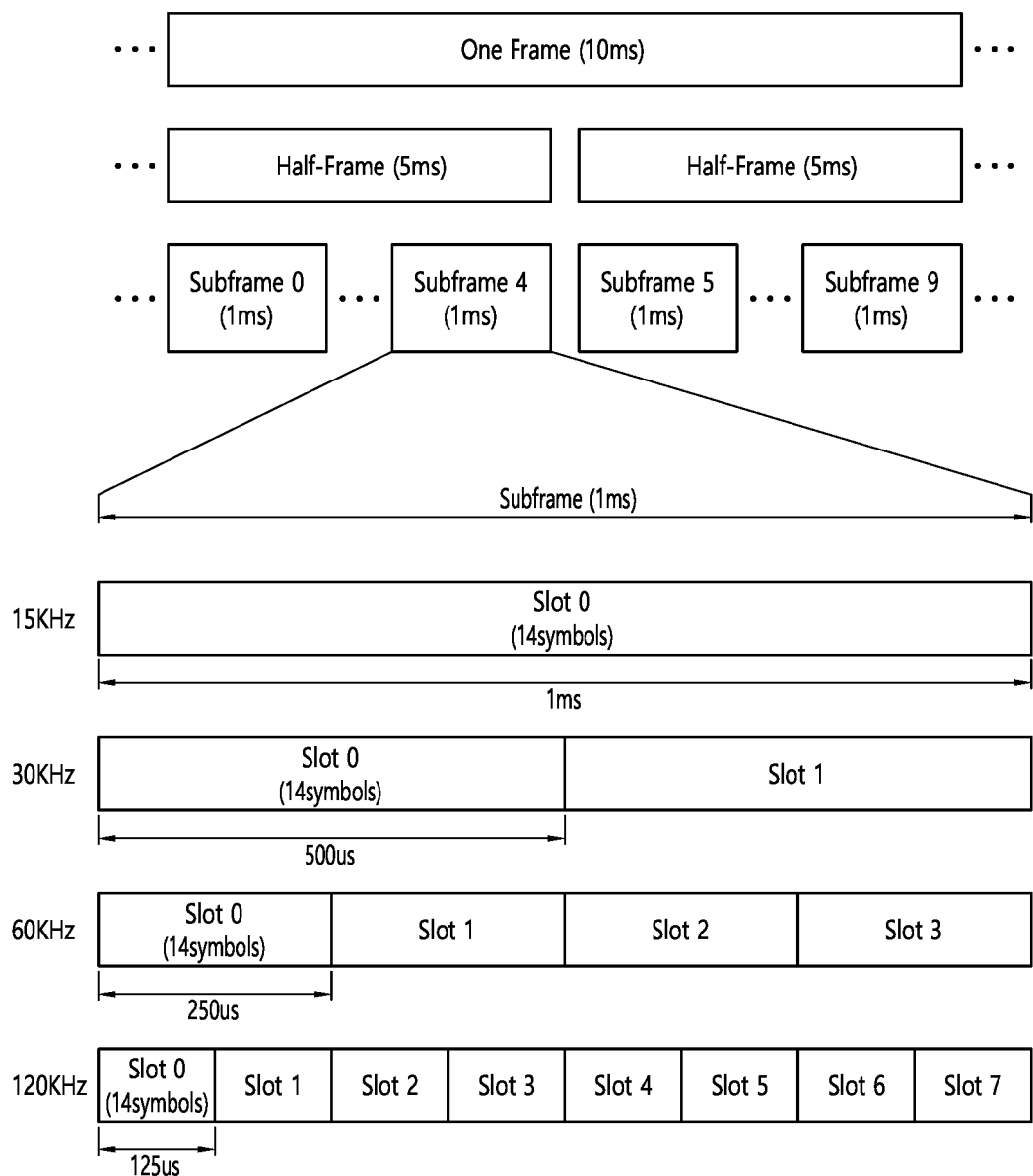
FIG. 3 illustrates an example of a frame structure that may be applied in NR.

FIG. 3 illustrates an example of a frame structure that may be applied in NR.

Referring to FIG. 3, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration $\mu$.

TABLE 1

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|  |  | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 3 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N_{symb}^{slot}$ | $N_{slot}^{frame, u}$ | $N_{slot}^{subframe, u}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

FIG. 4 illustrates a slot structure of an NR frame.

A slot may include a plurality of symbols in a time domain. For example, in case of a normal CP, one slot may include 14 symbols. However, in case of an extended CP, one slot may include 12 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an active BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 5:
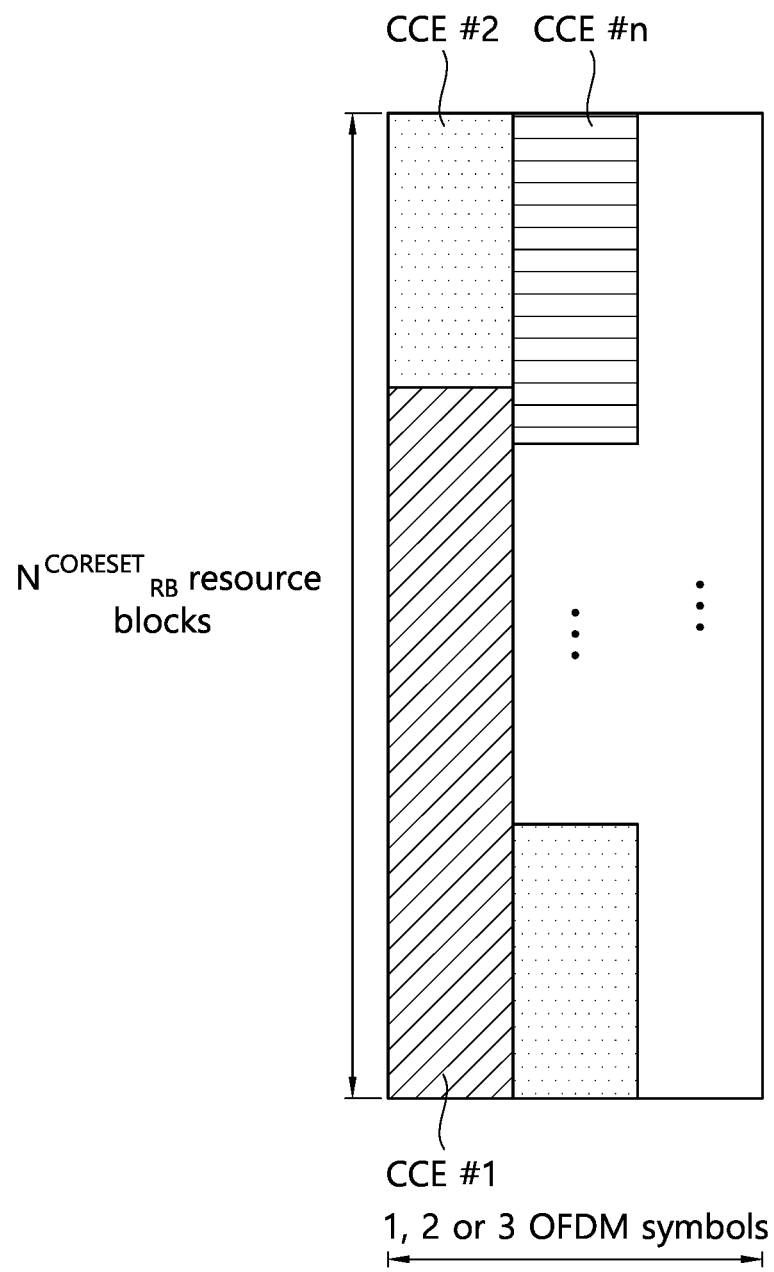
FIG. 5 illustrates CORESET.

FIG. 5 illustrates CORESET.

Referring to FIG. 5, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 5, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESET is radio resources for control information to be received by the UE and may use only a portion, rather than the entirety of the system bandwidth. The BS may allocate the CORESET to each UE and may transmit control information through the allocated CORESET. In the NR, the UE may receive control information from the BS, without necessarily receiving the entire system band.

The CORESET may include a UE-specific CORESET for transmitting UE-specific control information and a common CORESET for transmitting control information common to all UEs.

<Self-Contained Subframe Structure>

In NR, a structure in which a control channel and a data channel are time-division-multiplexed within one TTI can be considered as a frame structure in order to minimize latency.

Both a downlink control region and an uplink control region may be included in one frame/subframe/slot. Also, between the downlink control region and the uplink control region, it may be used for downlink data (DL data) transmission or uplink data (UL data) transmission. For example, DL transmission and UL transmission are sequentially performed within one subframe and thus DL data can be transmitted and UL ACK/NACK (Acknowledgement/Not-acknowledgement) can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 6:
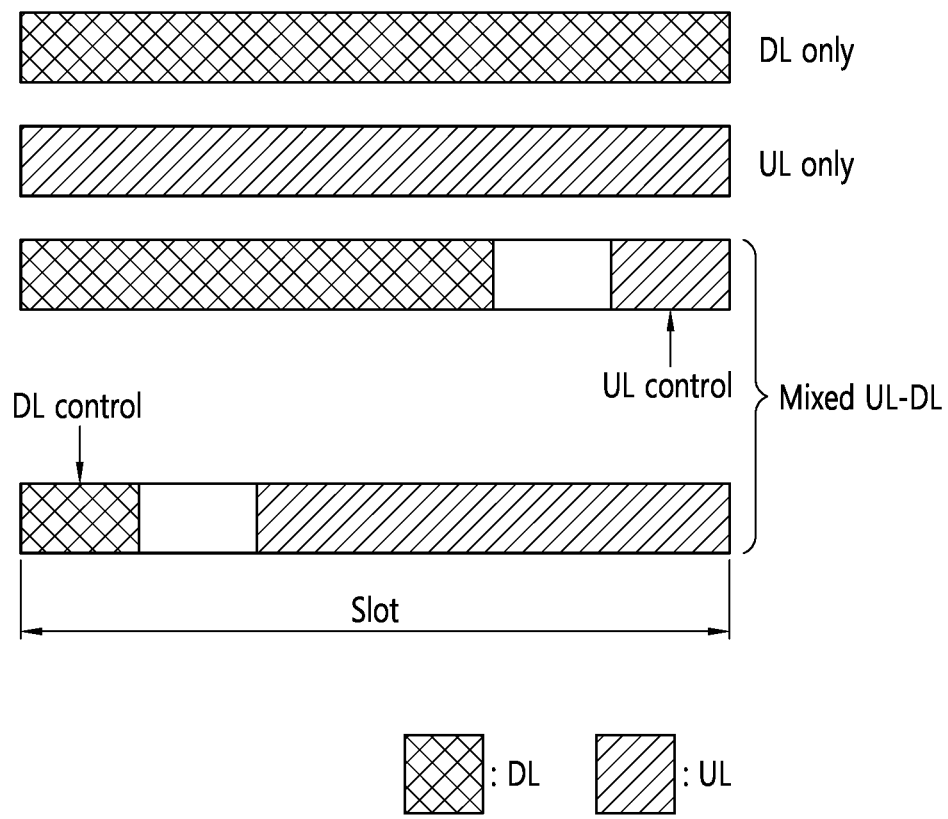
FIG. 6 illustrates a structure of a self-contained slot.

FIG. 6 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration, 2. UL only configuration, 3. Mixed UL-DL configuration: 1) DL region+Guard period (GP)+UL control region, 2) DL control region+GP+UL region. Here, DL region may be (i) DL data region, (ii) DL control region+DL data region and UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
|---|---|
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 7:
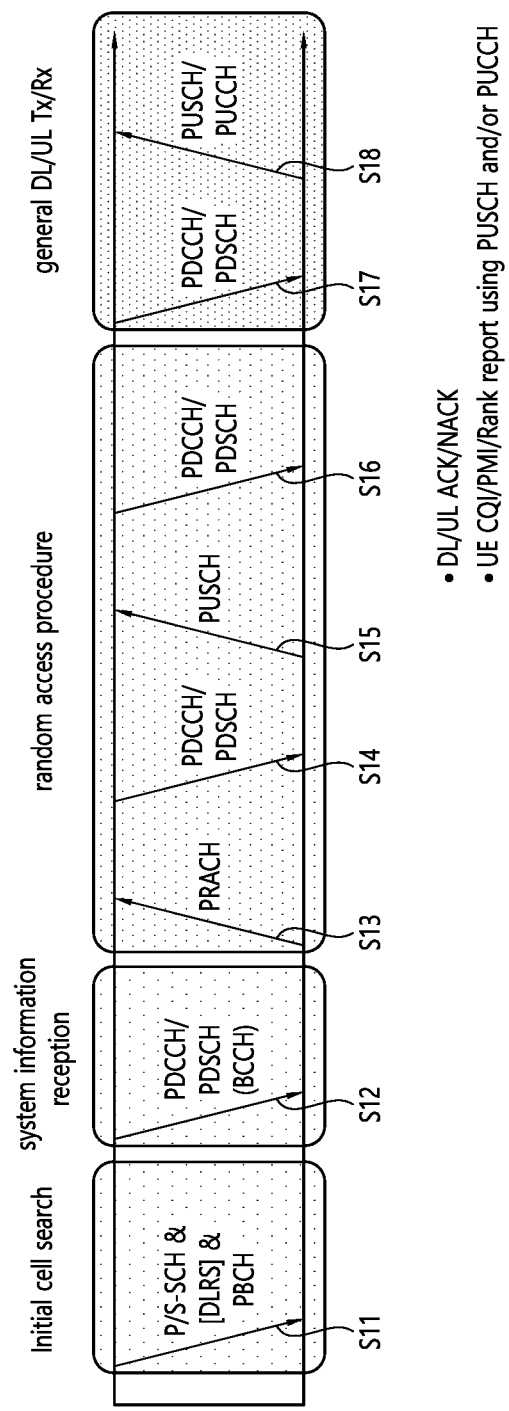
FIG. 7 illustrates physical channels and typical signal transmission.

FIG. 7 illustrates physical channels and typical signal transmission.

Referring to FIG. 7, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Figure 8:
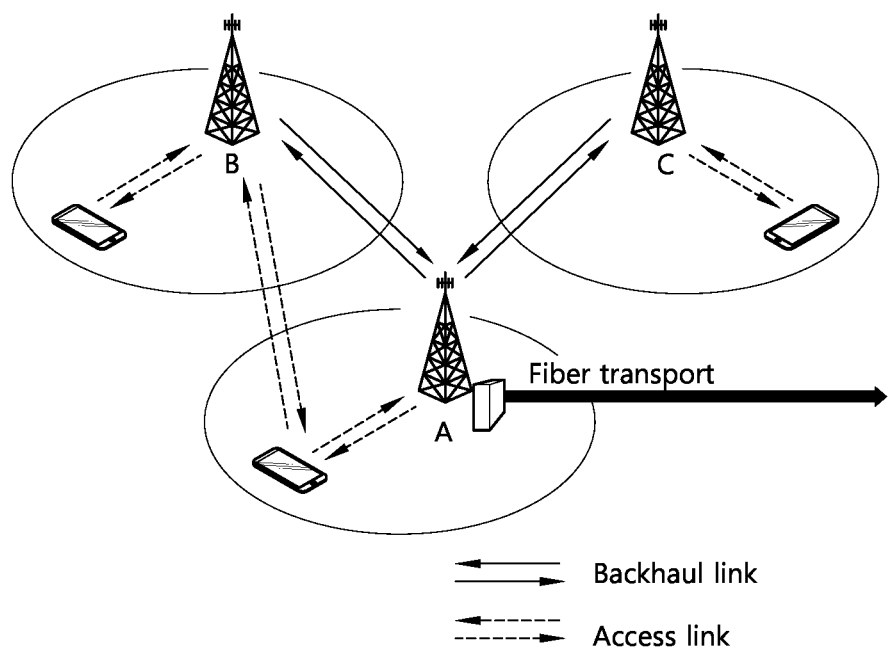
FIG. 8 schematically illustrates an example for a network with integrated access and backhaul links (IAB).

FIG. 8 schematically illustrates an example for a network with integrated access and backhaul links (IAB).

According to FIG. 8, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Efficient support of out-of-band relays may be important for some NR deployment scenarios. Close interworking with access links operating on the same frequency to accommodate duplex restrictions and avoid/mitigate interference is also very important.

Furthermore, operating the NR system in the millimeter wave spectrum may have problems such as severe short-term blocking that cannot be easily mitigated by the current RRC-based handover mechanism. Overcoming the short-term blocking in mmWave systems may require a fast RAN-based mechanism for switching between relay nodes that does not necessarily require the inclusion of a core network. It may also be necessary to develop an integrated framework that allows for fast switching of over-access and backhaul links. Over-the-air (OTA) coordination between relay nodes may also be considered to mitigate interference and support end-to-end path selection and optimization.

Addressing the following requirements in relation to IAB in NR may be necessary.

1) Efficient and flexible operation for in-band and out-of-band relaying in indoor and outdoor scenarios, 2) Multi-hop and redundant connections, 3) End-to-end path selection and optimization, 4) Support of backhaul links with high spectral efficiency, 5) Support of legacy NR UEs.

Legacy NR is designed to support half-duplex devices. Thus, half-duplex is supported and deserves to be targeted in the IAB scenario. Furthermore, IAB devices having a full duplex may also be considered.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 9:
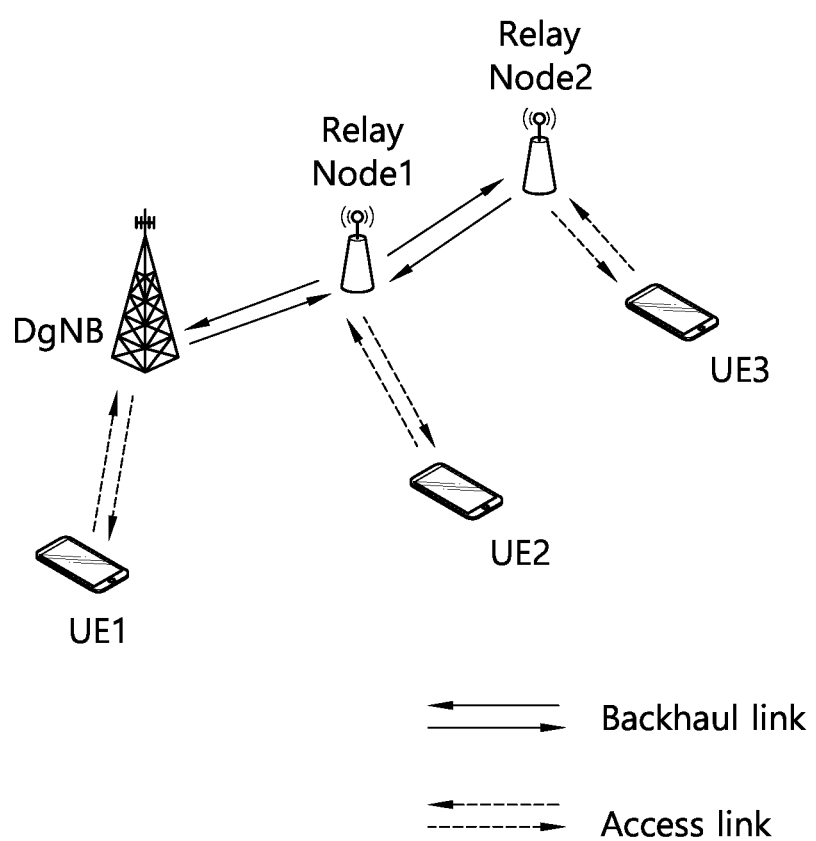
FIG. 9 schematically illustrates an example of the configuration of access and backhaul links.

FIG. 9 schematically illustrates an example of the configuration of access and backhaul links.

FIG. 9 illustrates an example in which a backhaul link and an access link are configured when DgNB and IAB relay nodes (RNs) exist. The DgNB, relay node 1, and relay node 2 are connected to a backhaul link, and UEs 1, 2, and 3 are sequentially connected to the DgNB, relay node 1, and relay node 2 through the access link.

The DgNB may make a scheduling decision of two backhaul links and three access links, and inform the scheduling results. Such centralized scheduling may include scheduling delays and cause latency issues.

If each relay node has a scheduling capability, distributed scheduling may be performed. Then, immediate scheduling of the uplink scheduling request of the UE can be performed, and the backhaul/access links can be used more flexibly by reflecting the surrounding traffic conditions.

Figure 10:
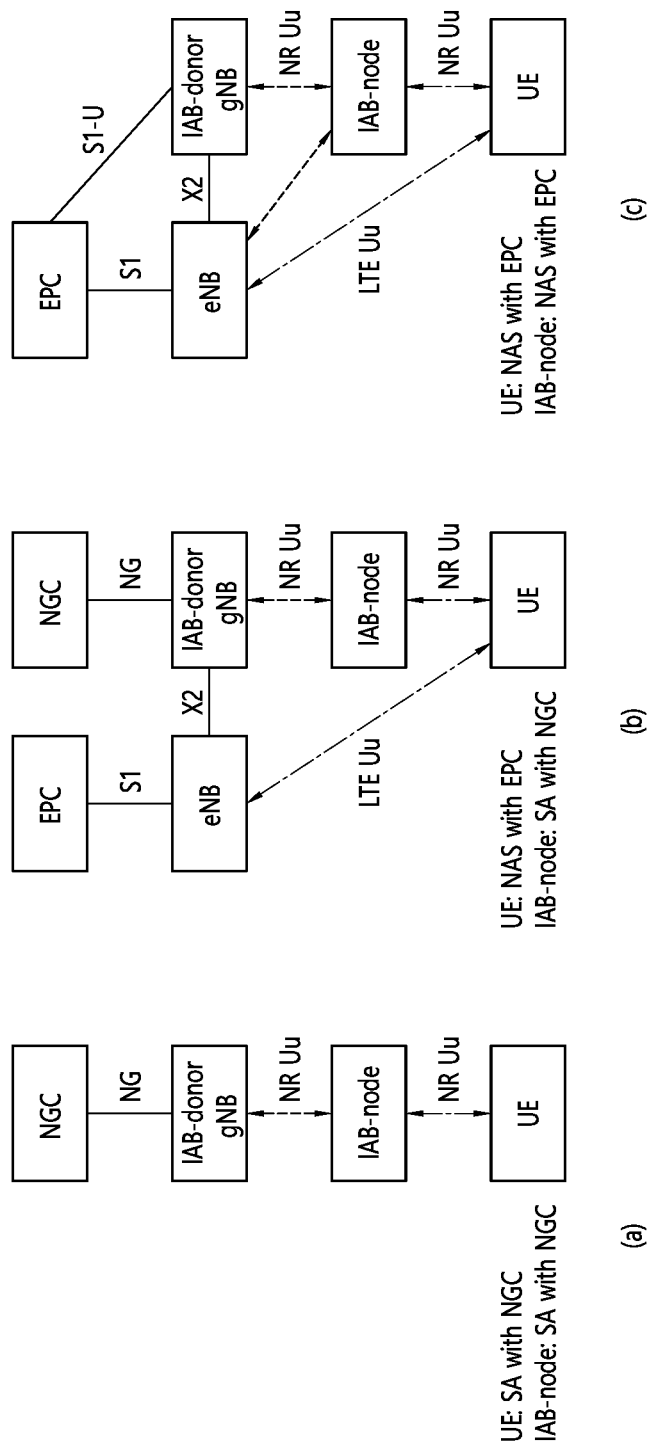
FIG. 10 illustrates the IAB node operating in stand alone (SA) mode or non-stand alone (NSA).

FIG. 10 illustrates that the IAB node operates in stand alone (SA) mode or non-stand alone (NSA).

FIG. 10 (*a*) illustrates that both the UE and the IAB node operate in SA mode in relation to the NGC, FIG. 10 (*b*) illustrates that the UE operates in the NSA mode in relation to the EPC while the IAB node operates in the SA mode in the relation with the NGC, and FIG. 10 (*c*) illustrates that both the UE and the IAB node operate in the NSA mode in relation to the EPC.

That is, the IAB node may operate in SA mode or NSA mode. When operating in NSA mode, the IAB node uses only the NR link for backhauling. A UE connecting to the IAB node may select an operation mode different from that of the IAB node. The UE may additionally connect to a different type of core network than the connected IAB node. IAB nodes operating in NSA mode may be connected to the same or different eNBs. A UE operating in the NSA node may connect to the same or different eNB as the connected IAB node.

Figure 11:
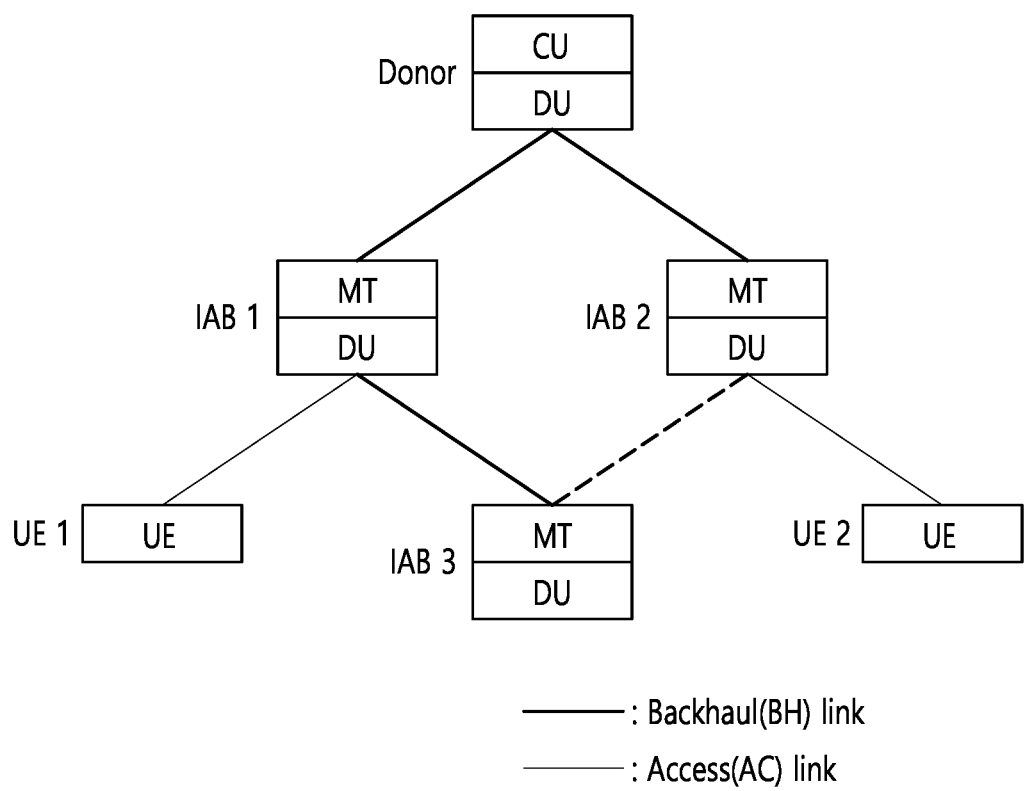
FIG. 11 illustrates a backhaul link and an access link.

FIG. 11 illustrates a backhaul link and an access link.

Referring to FIG. 11, a link between a donor node (which may be referred to as a parent node) and an IAB node or a link between IAB nodes is called a backhaul link. On the other hand, the link between the donor node and the UE or the link between the IAB node and the UE is called an access link. Specifically, the link between the MT of the IAB node and the DU of the parent node or the link between the DU of the IAB node and the MT of the child node of the IAB node is called a backhaul link, and the link between the DU of the IAB node and the UE may be referred to as an access link.

For communication with the parent node, the IAB node may be provided with an MT configuration indicating link direction information on a backhaul link between the parent node and itself. In addition, for communication with the child node, the IAB node may be provided with a DU configuration that informs the link direction for an access link between the child node/access UE and itself and link availability information.

Figure 12:
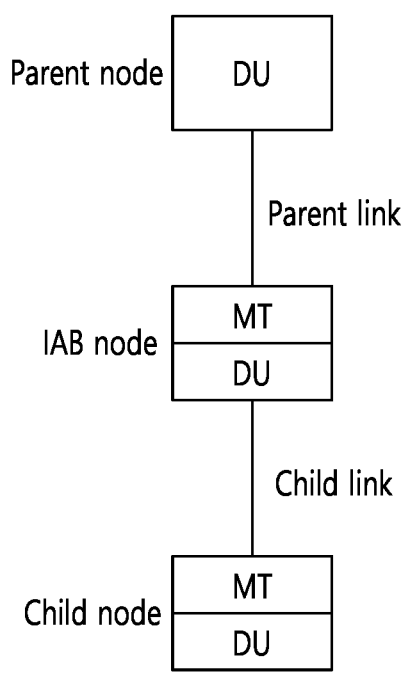
FIG. 12 illustrates a parent link and a child link.

FIG. 12 illustrates a parent link and a child link.

Referring to FIG. 12, a link between an IAB node (specifically, IAB MT) and a parent node (specifically, parent DU) is referred to as a parent link, and a link between an IAB node (specifically, IAB DU) and a child node (specifically, child MT) is called a child link. The parent link may be the above-mentioned backhaul link, and the child link may be a backhaul link or an access link depending on what the child node is. That is, if the child node is an IAB node, it may be a backhaul link, and if the child node is a UE, it may be an access link. TDM operation between parent link and child link has been previously discussed, and SDM/FDM and FD operation are currently being discussed.

From the point of view of the DU of the IAB node, there are multiple types of time resources for the child link, such as downlink (D), uplink (U), and flexible (F).

Each downlink, uplink and flexible time resource may be a hard, soft, or unavailable (not-available: NA) resource. Here, the unavailable resource means that the resource is not used for communication of the DU child link. Hard resources means that they are always available for communication on the DU child link. Whether soft resources can be used for communication in the DU child link (availability) may be explicitly and/or implicitly controlled by the parent node. This will be described later in more detail.

A configuration for a link (resource) direction (DL/UL/F) and link (resource) availability (Hard/Soft/NA) of a time resource for a DU child link may be referred to as a 'DU configuration'. DU configuration can be used for effective multiplexing and interference handling between IAB nodes. For example, the above configuration may be used to indicate for which link a time resource is valid for a parent link and a child link. It can also be used to coordinate interference between child nodes. Considering this aspect, the DU configuration may be more effective when configured semi-statically and configured specifically for an IAB node.

The availability of soft resources can be dynamically configured through physical layer (L1)-based implicit/explicit signals. Hereinafter, "IA" may mean that the DU resource is explicitly or implicitly indicated as available, and "INA" may mean that the DU resource is explicitly or implicitly indicated that it is unavailable. Dynamic L1-based signaling may indicate whether the DU soft resource is "IA" or "INA".

From a DU perspective, a soft resource may be in an IA (indicated as available) state or a non-IA state. In this case, the non-IA state may be interpreted as an INA (indicated as not available) state.

Whether the soft resource is IA may be indicated through AI (availability indicator) information, and the AI information may be indicated from the parent node to the IAB node through AI-DCI. The following DCI format 2_5 is an example of AI-DCI.

<DCI Format 2_5>

DCI format 2_5 is a DCI format used to inform the availability of soft resources. The following information may be transmitted through DCI format 2_5 together with CRC scrambled by AI-RNTI.

Availability indicator 1, availability indicator 2, . . . , availability indicator N.

The size of DCI format 2_5 with CRC scrambled by AI-RNTI may be configured by a higher layer up to 128 bits.

Meanwhile, the Tx/Rx timing alignment method of the IAB node that can be considered in the IAB environment may be as follows.
- Case 1: Alignment of DL transmission timing between IAB node and IAB donor.
- Case 2: DL and UL transmission timings are aligned within the IAB node.
- Case 3: DL and UL reception timings are aligned within the IAB node.
- Case 4: Within the IAB node, use case 2 for transmission and case 3 for reception.
- Case 5: In different time slots within the IAB node, use case 1 for access link timing and case 4 for backhaul link timing.
- Case 6: Using the DL transmission timing of case 1 and the UL transmission timing of case 2.
- Case 7: Using the DL transmission timing of case 1 and the UL transmission timing of case 3.

Hereinafter, some cases among the timing alignment cases will be described in more detail.

Timing alignment case 1 (hereinafter may be abbreviated as case 1).

Figure 13:
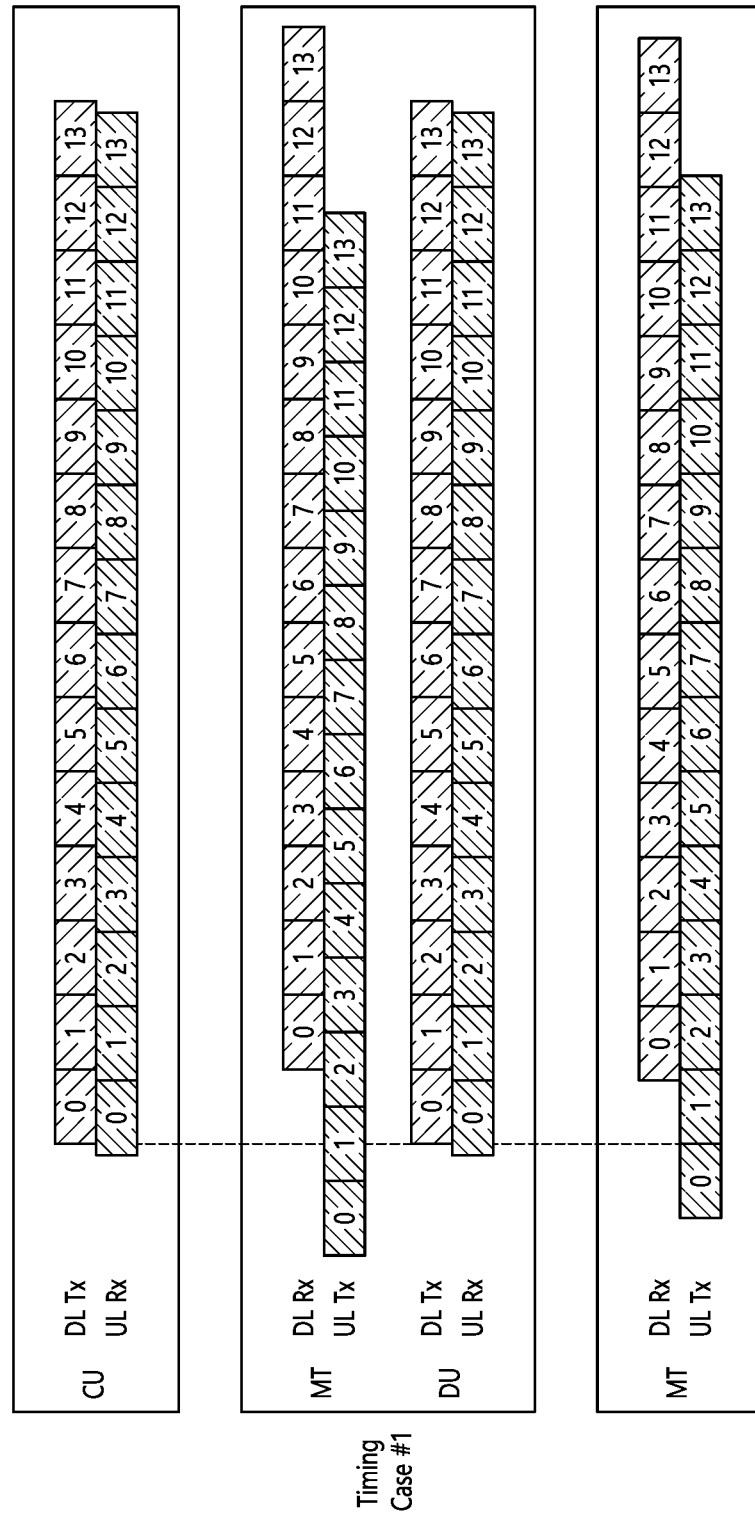
FIG. 13 illustrates timing alignment case 1.

FIG. 13 illustrates timing alignment case 1.

Referring to FIG. 13, in case 1, DL transmission (Tx) timing is aligned between an IAB node and an IAB donor (represented by a CU). That is, the DL Tx timing of DUs between IAB nodes is aligned, and this is a timing alignment method used by the Rel-16 IAB node.

If the DL Tx and UL Rx are not well aligned in the parent node, additional information about alignment may be required for the child node to properly set the DL Tx timing. The MT Tx timing may be expressed as 'MT Rx timing–TA', and the DU Tx timing may be expressed as 'MT Rx timing–TA/2–T_delta'. The T_delta value can be obtained from the parent node.

Timing alignment case 6 (hereinafter may be abbreviated as case 6)

Figure 14:
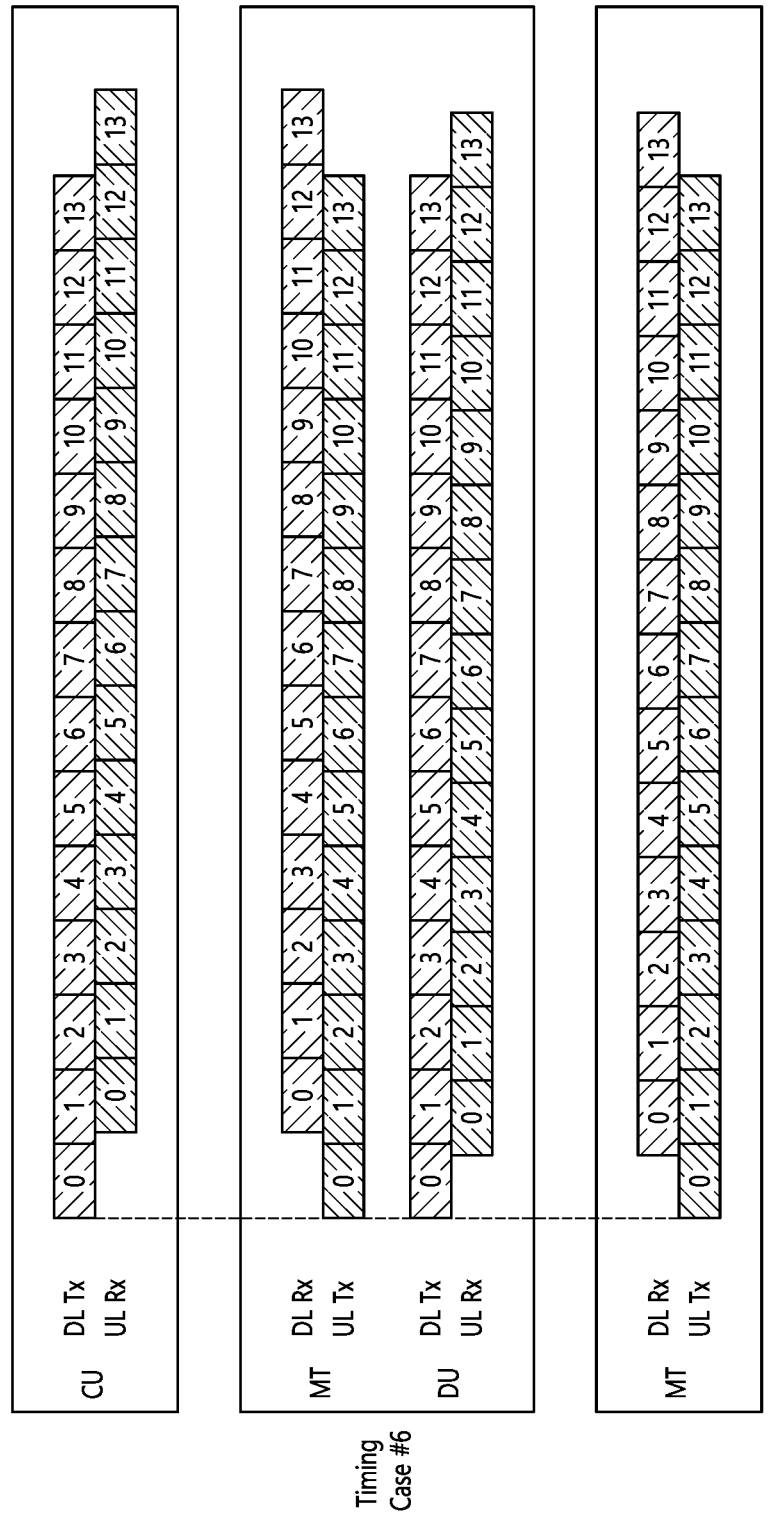
FIG. 14 illustrates timing alignment case 6.

FIG. 14 illustrates timing alignment case 6.

Referring to FIG. 14, Case 6 is a case in which DL transmission timings for all IAB nodes coincide with parent IAB node (CU) or donor DL timings. The UL transmission timing of the IAB node may be aligned with the DL transmission timing of the IAB node. That is, the MT UL Tx timing and the DU DL Tx timing of the IAB node are aligned.

Since the UL Tx timing of the MT is fixed, the UL Rx timing of the parent-DU receiving it is delayed by the propagation delay of the parent-DU and the MT compared to the UL Tx timing of the MT. The UL Rx timing of the MT varies according to the child MT that transmits the UL. When the IAB node uses the timing alignment case 6, the UL Rx timing of the parent node is different from the existing one. Therefore, if the IAB node wants to use the timing alignment case 6, the parent node also needs to know the corresponding information.

Timing alignment case 7.

Figure 15:
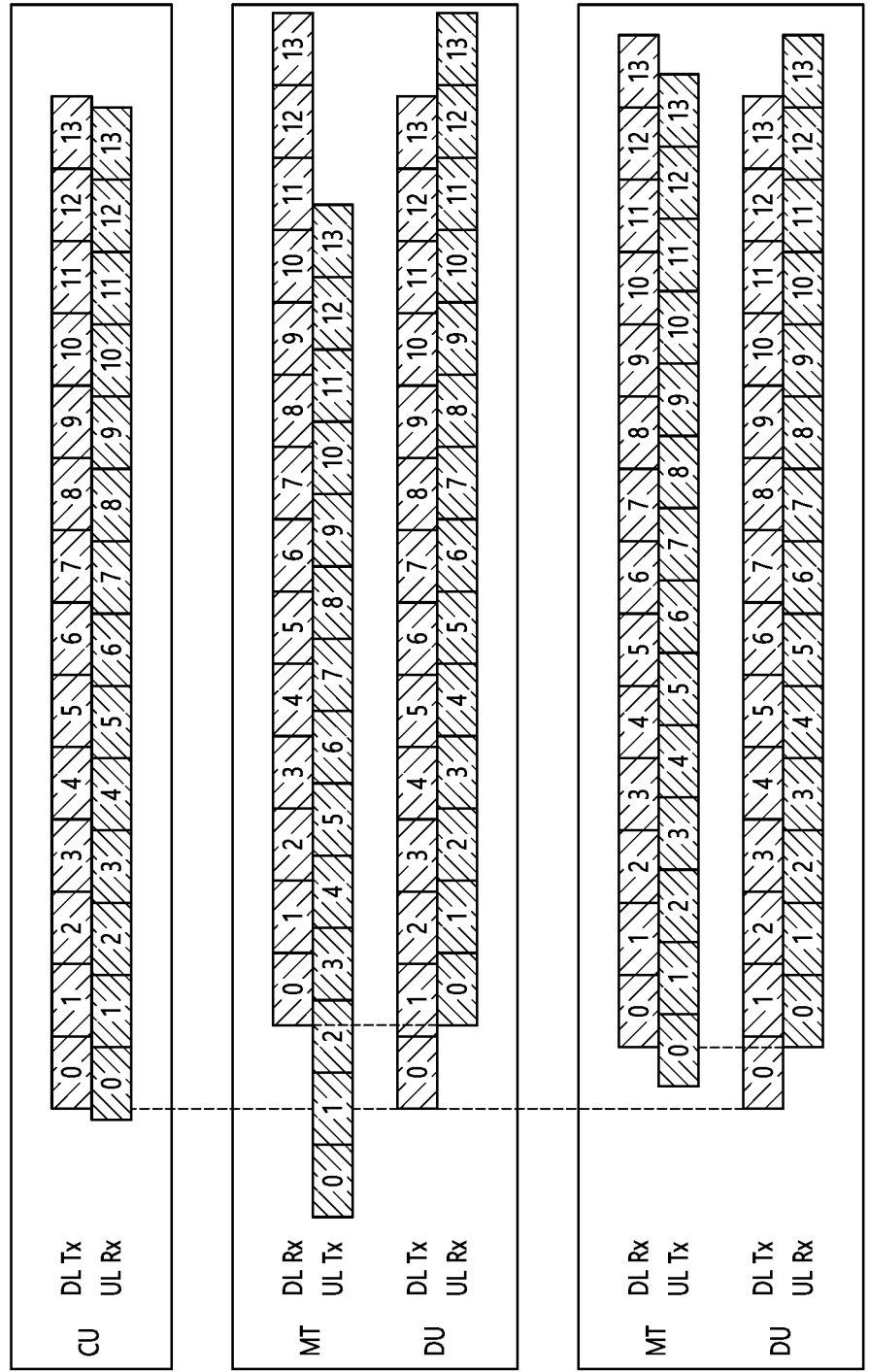
FIG. 15 illustrates timing alignment case 7.

FIG. 15 illustrates timing alignment case 7.

Referring to FIG. 15, in case 7, DL transmission timings for all IAB nodes coincide with parent IAB node or donor DL timings. The UL reception timing of the IAB node may coincide with the DL reception timing of the IAB node. If the DL Tx and UL Rx are not well aligned in the parent node, additional information about alignment may be required for the child node to properly set the DL Tx timing. Case 7 is a scheme in which the MT DL Rx timing of the IAB node and the DU UL Rx timing are aligned.

The transmission/reception timing from the MT perspective is the same as that of the existing IAB node (Rel-16 IAB node), and the UL Rx timing of the DU may be aligned with the DL Rx timing of the MT. The IAB node needs to adjust the TA of the child MTs so that the child MTs transmit UL signals according to IAB node's UL Rx timing.

This timing alignment method may not reveal a difference in the standard operation of the IAB node compared to the existing timing alignment method (Case 1). Accordingly, the timing alignment case 7 may be replaced/interpreted as the timing alignment case 1.

In the present disclosure, timing alignment may mean slot-level alignment or symbol-level alignment.

Meanwhile, for PRACH transmission, an IAB-node MT determines frames and subframes within the frames containing PRACH occasions. The IAB-node MT determines an association period for mapping SS/PBCH blocks to PRACH occasions based on a PRACH configuration period according to below table. An association pattern period includes one or more association periods and is determined so that a pattern between PRACH occasions and SS/PBCH blocks repeats at most every 640 msec. A PRACH occasion in a PRACH slot may be valid or invalid according to the conditions.

The following table illustrates the mapping between the PRACH configuration period for the MT of the IAB node and the SS/PBCH block.

TABLE 5

| PRACH configuration period (msec) | Association period, number of PRACH configuration periods |
|---|---|
| 10 | {1, 2, 4, 8, 16, 32, 64} |
| 20 | {1, 2, 4, 8, 16, 32} |
| 40 | {1, 2, 4, 8, 16} |
| 80 | {1, 2, 4, 8} |
| 160 | {1, 2, 4} |
| 320 | {1, 2} |
| 640 | {1} |

If an IAB-node is provided a value $T_{delta}$ from a serving cell, the IAB-node may assume that $(N_{TA}+N_{TA,offset}) \cdot T_c/2 + T_{delta}$ is a time difference between a DU transmission of a signal from the serving cell and a reception of the signal by the IAB-node MT when $(N_{TA} N_{TA,offset}) \cdot T_c/2 + T_{delta} > 0$. The IAB-node may use the time difference to determine a DU transmission time.

The present disclosure will now be described.

The content of the present disclosure is described assuming an in-band environment, but may also be applied in an out-band environment. In addition, the content of the present disclosure is described in consideration of an environment in which a donor gNB (DgNB), a relay node (RN), and a UE operate in a half-duplex, it can also be applied in an environment in which a donor gNB (DgNB), a relay node (RN), and/or a UE performs a full-duplex operation.

In an existing standard specification (e.g., Rel-15), various multiplexing options for MT and DU have been discussed. A current standard specification (e.g., Rel-16) stipulates a non-simultaneous operation between an MT and a DU. In addition, a future standard specification (e.g., Rel-17) may include a simultaneous operation between the MT and the DU in order to increase spectral efficiency and reduce latency.

FIG. 16 illustrates asynchronous and simultaneous operation.

Referring to (a) of FIG. 16, the MT and the DU may be operated in the TDM scheme under the half-duplex constraint per link. That is, only one of the MT and the DU may operate at a specific time. For example, any one of MT transmission, MT reception, DU transmission, and DU reception may be operated.

Referring to (b) of FIG. 16, the MT and the DU may simultaneously transmit and/or receive at a specific time point. For example, the MT and the DU may operate at the same time as any one of MT transmission/DU transmission, MT reception/DU reception, MT transmission/DU reception, and MT reception/DU transmission.

For the simultaneous operation of the MT and the DU, it may be assumed that the MT and the DU have independent panels and the amount of inter-panel interference is negligible (e.g., the MT and the DU may be separately disposed). In such an environment, it can be assumed that the parent link and the child link are physically separated, so that simultaneous transmission and/or reception can be performed without interference through the link. Thus, timing alignment for simultaneous transmission and/or reception may not be necessary.

An environment in which antenna panels for MT and DU are disposed together or an antenna panel for MT and DU are shared may also be considered. In this case, for simultaneous operation, the influence of interference between the parent link and the child link should be considered. In such an environment, the following multiplexing scheme may be considered according to the combination of MT and DU transmission directions.

A. MT-Tx/DU-Tx or MT-Rx/DU-Rx (1) SDM

Simultaneous Tx or Rx between the MT and the DU may be performed in an SDM manner. For receiver-side SDM, orthogonality between DL DMRS and UL DMRS is important to successfully separate the two Rx signals. For DMRS orthogonality, timing alignment between MT-Rx and DU-Rx is required.

When the MT and the DU receive the PDSCH and the PUSCH, respectively, the DMRS for the PDSCH and the DMRS for the PUSCH may be orthogonally allocated. Therefore, the IAB node can receive both channels at the same time. However, SDM for other combinations of DL and UL channels may not be appropriate because orthogonal DMRS assignments cannot be used. Therefore, SDM for simultaneous reception can be used in limited cases such as PDSCH and PUSCH reception.

(2) FDM

FDM can be another option for simultaneous Tx or Rx between MT and DU within the carrier bandwidth. One way to ensure that the parent link and the child link utilize different frequency resources is to separate the frequency resources at the BWP level. For example, when the MT of the IAB node performs uplink transmission within the uplink BWP, the DU of the IAB node may utilize the downlink BWP composed of frequency resources that do not overlap with the uplink BWP of the MT.

Even if the frequency resources for the parent link and the child link are separated, the received signals of the parent link and the child link may interfere with each other according to the amount of interference emitted from the adjacent frequency resource. Rx timing alignment between MT and DU may be necessary if the interference level is not low enough. However, if the Rx power between the MT and the DU is properly adjusted and an appropriate amount of guard resource is assumed between the frequency resources of the MT and the DU, the timing alignment between the MT and the DU Rx may not be necessary.

B. Full Duplex for MT-Tx/DU-Rx or MT-Rx/DU-Tx

For simultaneous transmission/reception between the MT and the DU, intra-device interference (i.e., interference from MT-Tx to DU-Rx or DU-Tx to MT-Rx) should be considered. Compared with inter-reception interference in simultaneous reception, an IAB node can experience stronger interference because its transmit signal arrives at its receive antenna without path loss. Therefore, the interference level for adjacent frequency resources may be much higher than in the case of simultaneous reception. Accordingly, such interference may occur not only when the MT and the DU share a frequency resource but also when a separate frequency resource is used. In order to apply the interference mitigation technique to solve the in-device interference problem, an interference mitigation technique in which timing alignment between the DU and the MT is a basic requirement may need to be performed.

The present disclosure proposes a method in which MT and DU of an IAB node perform multiplexing in an FDM method using different frequency resources.

FDM in BWP units proposed in the present disclosure means that when MT and DU exist in an IAB node, MT and DU perform transmission/reception using BWPs in which frequency resources do not overlap each other in the same time resource. To this end, in the same time resource, the frequency resources of the BWP used by the MT for transmission/reception with the parent DU through the parent link and the frequency resource of the BWP used by the DU for transmission/reception with the child MT/access UE through the child link are separated from each other (so as not to overlap).

Figure 17:
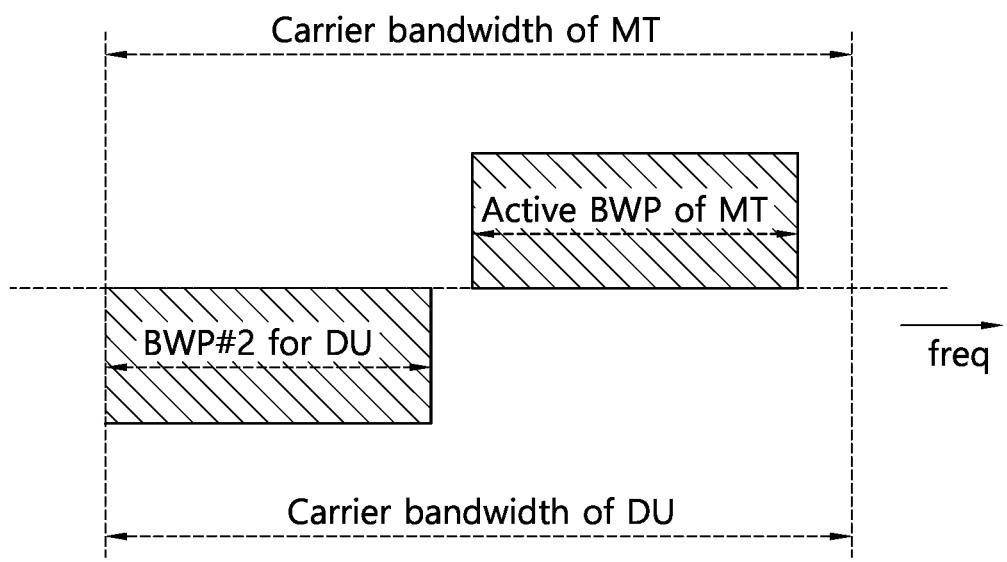
FIG. 17 illustrates the active BWP of the MT and DU of the IAB node.

FIG. 17 illustrates the active BWP of the MT and DU of the IAB node.

Referring to FIG. 17, the carrier bandwidth in which the MT and the DU in the IAB node operate may be the same. In this case, the frequency resources of the active BWP of MT performing transmission/reception with the MT at a specific time point and the active BWP of DU performing transmission/reception of the DU may be configured so as not to overlap. In this case, the MT and DU may perform transmission and reception at the same time through the distinctive frequency resources. In this case, the active BWP of the DU may mean a BWP used by the DU for transmission/reception to a child link, that is, a BWP used by a child MT/access UE of the DU for transmission/reception with the corresponding DU.

A. Operation of MT and DU According to Operating BWP Resources.

Depending on the frequency resource configuration of the operating frequency (=active BWP) at which the DU and the MT of the IAB node each transmit and receive, the frequency resources of the active BWP of the MT and the active BWP of the DU may or may not overlap each other at a specific time.

Figure 18:
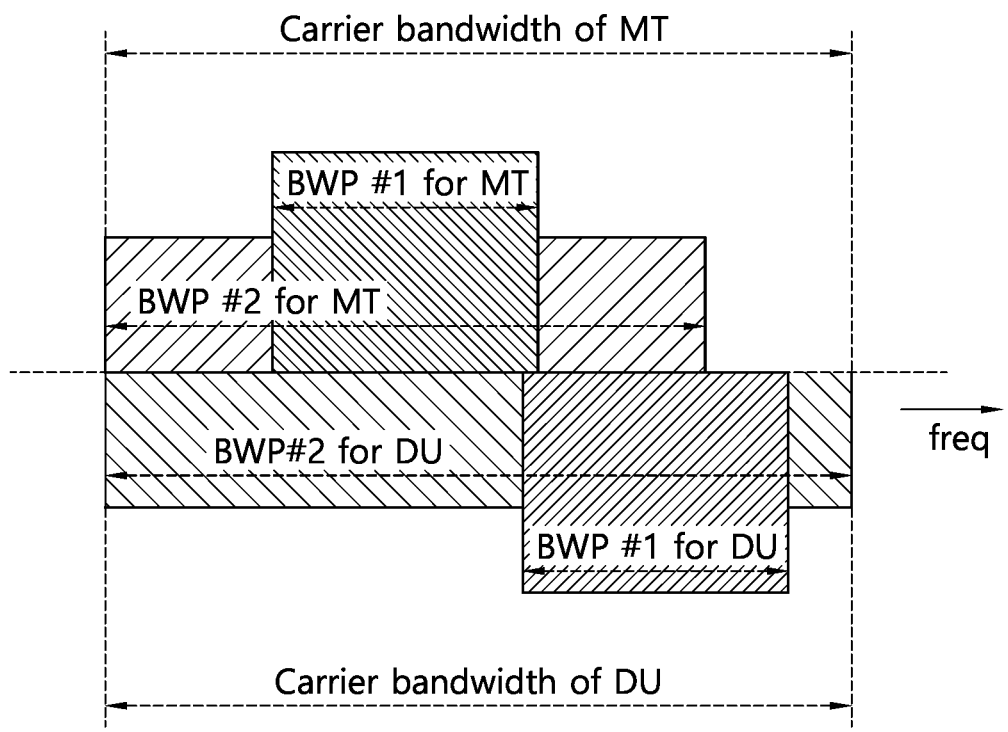
FIG. 18 is another example of the active BWP of MT and DU.

FIG. 18 is another example of the active BWP of MT and DU.

Referring to FIG. 18, the MT and the DU may be configured with BWP #1 and BWP #2 (two BWPs), respectively. At this time, if the MT operates in BWP #1 at a certain point and the DU operates in BWP #1, the frequency resources that make up the active BWP of MT and DU will not overlap. However, if the MT operates in BWP #2 at a certain point and DU operates at BWP #1 or #2, or if DU operates in BWP #2 and MT operates at BWP #1 or #2, the frequency resources that make up the activation of MT and DU are overlapped.

The IAB node may operate as follows according to the frequency resource configuration of the operating BWP (=active BWP) of the MT and the operating BWP (=active BWP) of the DU.

Method 1. When the frequency resources of the operating BWP of the MT of the IAB node and the operating BWP of the DU of the same IAB node overlap in a specific time resource, it is determined that the IAB node does not/cannot perform simultaneous operation (simultaneous operation). On the other hand, when the frequency resources of the operating BWP of the MT and the operating BWP of the DU do not overlap in a specific time resource, the IAB node may determine that the simultaneous operation can be performed.

Method 2. When the frequency resources of the operating BWP of the MT and the operating BWP of the DU in the same IAB node overlap in a specific time resource, the IAB node may determine that the simultaneous operation is performed through SDM. On the other hand, when the frequency resources of the operating BWP of the MT and the operating BWP of the DU do not overlap in a specific time resource, the IAB node may determine that it can perform the simultaneous operation through the FDM.

The content of the disclosure means that it is determined whether or not the frequency resources of the operating BWP overlap, regardless of whether the PRB resources in which the MT and the DU each actually transmit and receive overlap.

If the DU of the IAB node has multiple child links, that is, when the DU serves a plurality of child MTs/access UEs, the BWP (frequency resource constituting the operating BWP) may be different for each child link.

In this case, the IAB node may determine the above operation based on the frequency resources corresponding to the union of the frequency resources of the operating BWP of all child links of the DU.

For example, it may be said that the DU has two child links, and the operating BWPs to the two child links are the operating BWP 1 of the DU and the operating BWP 2 of the DU, respectively. At this time, if the frequency resource of the MT's operating BWP overlaps with the DU's operating BWP 1 or the DU's operating BWP 2, the IAB node determines that simultaneous operation between the MT and the DU is not performed/cannot be performed in accordance with the method 1. Otherwise, the IAB node may determine that simultaneous operation between the MT and the DU can be performed.

Alternatively, the IAB node may determine the simultaneous operation method of the MT and the DU based on the operating BWP to the corresponding child link for each child link of the DU.

For example, it may be said that the DU has two child links, and the operating BWPs to the two child links are the operating BWP 1 of the DU and the operating BWP 2 of the DU, respectively. At this time, according to method 1, if the operating BWP of the DU overlaps with the frequency resource of the operating BWP of the MT for the operating BWP 1 of the DU and the operating BWP 2 of the DU, respectively, it is determined that transmission and reception of the operating BWP of the MT and the operating BWP of the DU are not performed at the same time. And if there is no overlap, it may be determined that transmission and reception of the operating BWP of the MT and the operating BWP of the corresponding DU can be simultaneously performed. Or, according to method 2, when the DU operating BWP overlaps with the frequency resource of the MT operating BWP with respect to the DU operating BWP 1 and the DU operating BWP 2, respectively, the IAB node determines that simultaneous operation through SDM is performed between the operating BWP of the MT and the corresponding DU operating BWP. If the operating BWP of the DU does not overlap the frequency resource of the operating BWP of the MT, the IAB node may determine that the operating BWP of the MT and the operating BWP of the DU perform simultaneous operation through FDM.

B. A Method of Determining the Active BWP for Simultaneous Operation

If the frequency resources of the active BWPs between the MT and the DU of the IAB node do not overlap, the IAB node may perform the simultaneous operation between the MT and the DU by using the FDM. However, if the parent node of the corresponding IAB node does not know whether the simultaneous operation of the IAB node is possible, DL/UL scheduling cannot be properly performed. Therefore, the parent node should be able to know whether simultaneous operation of the IAB node in a specific time resource is possible or whether the frequency resources of the operating BWPs between the MT and the DU overlap. For this, the following actions are proposed.

Method 1. The IAB node and/or the parent node (parent DU) may receive all or part of the following information for each BWP configured by the MT of the IAB node to operate as a parent link.

Information on whether simultaneous operation between the MT and the DU is possible when the MT operates in the corresponding BWP When the MT operates in the corresponding BWP, information on the scheme applied for multiplexing between the MT and the DU. Such information may indicate a scheme applied among SDM or FDM, or inform a scheme applied among TDM, SDM, or FDM.

Such information may be determined by the CU/donor and notified to the IAB node and/or the parent node through signaling such as RRC/F1-AP.

Based on the above information, the IAB node can determine and operate whether simultaneous operation between the MT and the DU is possible according to the operating BWP of the MT or the scheme to be applied for multiplexing between the MT and the DU. In other words, according to the operating BWP of the IAB node MT, whether simultaneous operation between MT and DU of IAB node is possible and/or the scheme applied for multiplexing between MT and DU can be determined.

The parent node of the IAB node, based on the operating BWP of the IAB node MT, may determine whether simultaneous operation between the MT and the DU of the IAB node is possible or a scheme applied for multiplexing between the MT and the DU. For example, when the MT of the IAB node operates with the BWP set to enable simultaneous operation in a specific time resource, parent nodes can determine that the IAB node can perform simultaneously in the time resource. To this end, when the IAB node operates with a BWP set to enable simultaneous operation in a specific time resource, the IAB node should be able to perform simultaneous operation between MT and DU. To this end, for example, the IAB node DU can operate using BWP which does not overlap with MT's operating BWP.

Method 2. Whether simultaneous operation between the DU and the MT of the IAB node is possible may be configured for each time resource. For example, the IAB node can be configured with information on time resources where simultaneous operation between DU and MT can be performed from parent nodes or CU/donor nodes. In this case, the IAB node may determine that simultaneous operation between the DU and the MT is impossible in a section other than the time resource.

In this case, the operating BWP (active BWP) or operable BWP of the IAB node MT and/or DU may be determined according to whether the DU and the MT are simultaneously operated in a specific time resource. That is, depending on whether they operate simultaneously, the BWP in which the IAB node MT and/or the DU operates or the BWP (candidate BWP) that can be determined as the operating BWP may be different.

In a time resource capable of simultaneous operation, the IAB node may determine that the BWP capable of simultaneous operation is set as the operating BWP of the MT. That is, in a time resource capable of simultaneous operation, it may be determined that simultaneous operation can be performed in the operating BWP of the MT in the corresponding time resource.

The IAB node may operate by using a BWP set to enable simultaneous operation among the BWPs of the DU or by selecting an operating BWP (active BWP) from among the BWPs in a time resource capable of simultaneous operation.

For this operation, the IAB node DU may receive the following information set.

the IAB node DU can be configured with the configuration whether simultaneous operation is possible for each BWP set for child MT/access UE. If the IAB node DU has child MT 1 and child MT 2, and child MT 1 and child MT 2 each is configured with 2 BWPs, the IAB node can be set whether simultaneous operation is possible for each BWP for a total of 4 BWPs. This configuration may be transmitted from the CU/donor node through signaling such as RRC and F1-AP.

the IAB node DU can be set for simultaneous operation for each frequency resource area of their bandwidth resources. That is, the operating frequency resource area (bandwidth) of the IAB node DU is divided into a plurality of areas, and whether simultaneous operation is possible for each area can be set. Alternatively, information related to resources capable of (non-possible) simultaneous operation among the operating frequency resource regions of the IAB node DU may be set, and it may be determined that simultaneous operation is impossible (possible) in the remaining frequency resources. This configuration may be determined/delivered from the CU/donor node through signaling such as RRC and F1-AP. Alternatively, such a configuration may be determined/delivered from the parent node through signaling such as MAC and DCI.

Hereinafter, a method in which the MT and the DU of the IAB node perform FDM multiplexing using different frequency resources will be described in more detail.

A. Operation According to Frequency Domain H/S/NA

For FDM operation between IAB-MT (hereinafter simply can be referred to as MT) and IAB-DU (hereinafter simply can be referred to as DU), frequency resources used by IAB-MT and IAB-DU should not overlap. Since the resource scheduling of the IAB-MT is performed by the parent DU, it may not be easy to dynamically adjust the scheduling-based frequency resource between the IAB-MT and the IAB-DU. Therefore, it may be desirable to separate the frequency resources of IAB-MT and IAB-DU.

Specifically, the IAB-DU may be configured with the frequency domain H/S/NA attribute for its own frequency resource set within the operating bandwidth. Also, these configurations may be shared with the parent DU. Based on these configurations, the IAB-DU may determine available frequency resources in case of FDM. When the IAB-MT requests FDM together with the IAB-DU, the parent-DU may determine available frequency resources for the IAB-MT.

The IAB-DU may be configured with hard (hard: H), soft (soft: S), and/or not available (not available: NA) information for frequency resources from the donor node/CU. In the present disclosure, it is described based on receiving one of H, S, and NA configuration/information for a specific frequency resource of the DU, the content of the present disclosure may include that only H and NA resources are defined and configured except for S. In the present disclosure, such configuration/information may be referred to as frequency domain H/S/NA configuration/information (or may be referred to as frequency domain HSNA information).

Specifically, the H, S, and NA frequency resources may mean the following.

Hard (H): refers to a frequency resource in which the DU can perform transmission and reception.

Not available (NA): refers to a frequency resource in which the DU cannot perform transmission and reception.

Soft (S): refer to a frequency resource in which whether DU transmission/reception is possible is not determined. It refers to a resource in which whether DU transmission/reception is possible is determined dynamically and explicitly and/or determined implicitly by an additional indication or according to whether IAB-MT is used.

IAB-DU can perform transmission and reception in a frequency resource set as hard. In these frequency resources, IAB-MT operating in FDM with IAB-DU do not perform transmission/reception.

The IAB-DU does not transmit/receive in a frequency resource set as NA. In these frequency resources, IAB-MT operating in FDM with IAB-DU may perform transmission/reception.

If it is indicated that the frequency resource set as soft is available by additional signaling, the IAB-DU may perform transmission/reception in the corresponding resource. Alternatively, even if the frequency resource configured as soft is not indicated to be available by additional signaling, the IAB-DU can perform transmission/reception if it does not disturb the transmission/reception of the IAB-MT in the corresponding resource. In these frequency resources, IAB-MT operating in FDM with IAB-DU do not transmit/receive when the corresponding frequency resource is indicated to be available to the DU by additional signaling. Otherwise, the IAB-MT may use the corresponding frequency resource for transmission and reception. In this case, additional signaling indicating the availability of the DU soft resource is referred to as a frequency domain availability indication.

Figure 19:
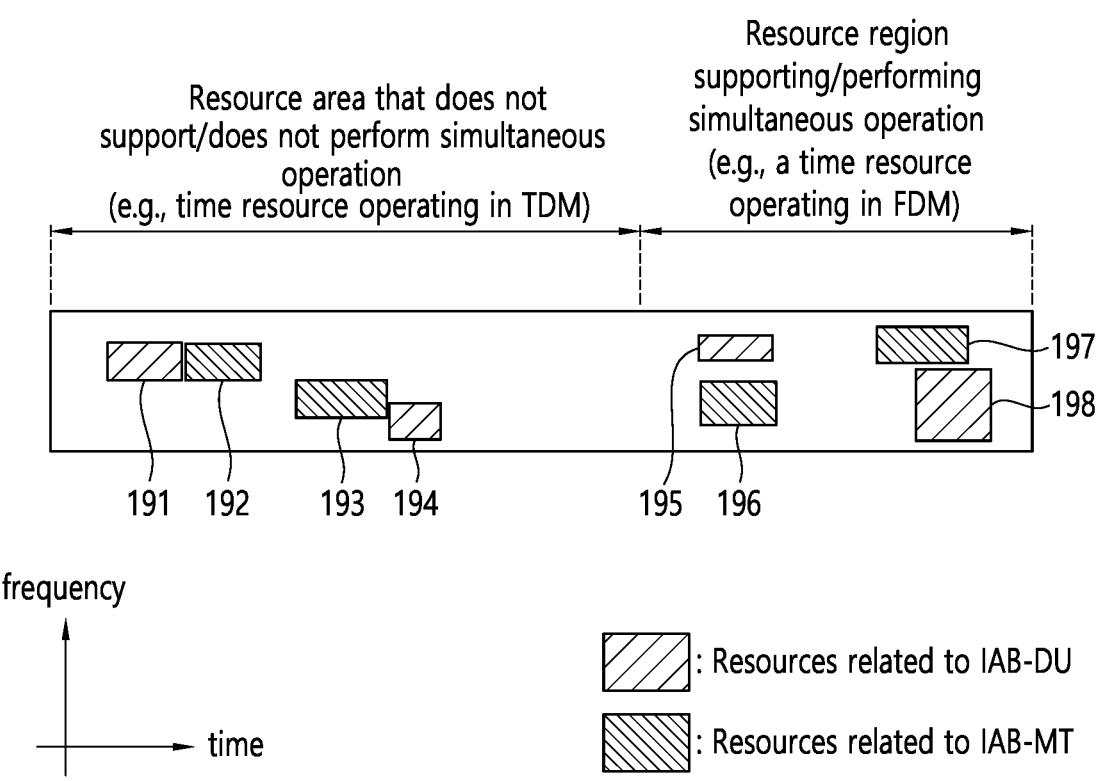
FIG. 19 exemplifies a resource that performs a simultaneous operation and a resource that does not perform a simultaneous operation.

FIG. 19 exemplifies a resource that performs a simultaneous operation and a resource that does not perform a simultaneous operation.

Referring to FIG. 19, resources 191, 194, 195, and 198 may be configured for the DU, and resources 192, 193, 196, and 197 may be configured for the MT. Resources 191 to 194 are included in a resource area that does not support/does not perform simultaneous operation (e.g., time resource operating in TDM), resources 195 to 198 may be included in a resource region supporting/performing simultaneous operation (e.g., a time resource operating in FDM).

For example, resources 191 and 192 may be set to the same frequency at different times, and resources 193 and 194 may be set to some overlapping frequencies at different times. Resources 195 and 196 may be set to different frequencies at the same time, and resources 197 and 198 may be set to different frequencies at some overlapping time.

The IAB-node may determine the operating frequency resources of the IAB-DU and the IAB-MT by applying the frequency domain H/S/NA configuration in the time resource for performing FDM (or in time resources that do not perform TDM (i.e. support/perform simultaneous operations)).

The IAB-node may determine the operating frequency resources of the IAB-DU and the IAB-MT without considering the frequency-domain H/S/NA configuration in the time resource that does not perform FDM or performs TDM (i.e. in the time resource that does not support/does not perform simultaneous operations).

In order to determine the operable resources of the IAB-DU and IAB-MT, the IAB-node may consider both the existing time domain H/S/NA configuration and the proposed frequency-domain H/S/NA configuration information. IAB-DU uses time domain H/S/NA configuration and time domain availability indication (e.g., availability indication according to DCI format 2_5) to determine operable time resources, and uses frequency-domain H/S/NA configuration and frequency-domain availability indication to determine operable frequency resources.

In this case, it can operate as follows.

IAB-DU does not operate on non-operable time resources.

The IAB-DU does not operate in a frequency resource that is not determined to be operable with respect to a time resource determined to be operable.

The IAB-DU may operate in a frequency resource determined to be operable with respect to a time resource determined to be operable.

In this case, the IAB-MT may be operable in a time/frequency resource in which the IAB-DU does not operate.

The frequency-domain H/S/NA configuration for this IAB-DU may also be configured for the parent-DU of the corresponding IAB-node. That is, the IAB-DU may be configured with the frequency-domain H/S/NA configuration for the IAB-DU of its child node from the donor/CU. Using this information, the IAB-DU can determine a frequency resource capable of transmitting and receiving with its own child-MT.

Figure 20:
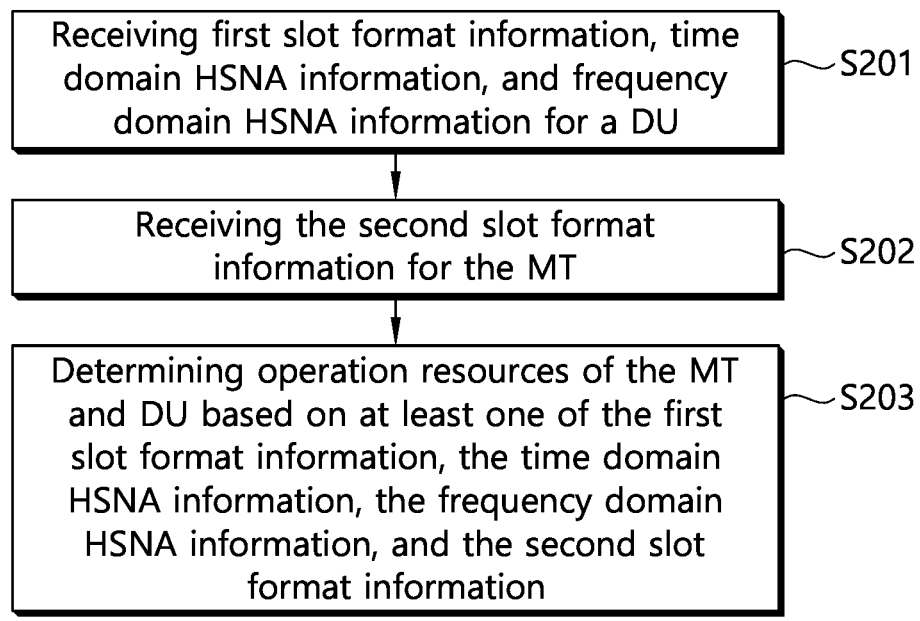
FIG. 20 illustrates an operation method of an IAB node including an MT and a DU in a wireless communication system.

FIG. 20 illustrates an operation method of an IAB node including an MT and a DU in a wireless communication system.

Referring to FIG. 20, the IAB node receives first slot format information, time domain HSNA information, and frequency domain HSNA information for a DU (IAB-DU) (S201). The IAB node may receive the information from, for example, a parent node or a centralized unit (CU).

For example, for each cell in the IAB-DU, the IAB-DU may be provided with first slot format information for each slot, time domain HSNA configuration information, frequency domain HSNA information, and the like by 'gNB-DU cell resource configuration'.

The following table shows an example of gNB-DU cell resource configuration.

TABLE 6

| IE/Group Name | Presence | Range | IE type and reference | Semantics description | Criticality | Assigned Criticality |
|---|---|---|---|---|---|---|
| Subcarrier Spacing | M | | ENUMERATED (kHz15, kHz30, kHz60, kHz120, kHz240, spare3, spare2, spare1, . . .) | Subcarrier spacing used as reference for the TDD/FDD slot configuration. | YES | reject |
| DUF Transmission Periodicity | O | | ENUMERATED (ms0p5, ms0p625, ms1, ms1p25, ms2, ms2p5, ms5, ms10, . . .) | | YES | reject |
| DUF Slot Configuration List | | 0 . . . 1 | | | | |
| >DUF Slot Configuration Item | | 1 . . . <maxnoofDUFSlots> | | The maxNrofSlots | — | |

TABLE 6-continued

| IE/Group Name | Presence | Range | IE type and reference | Semantics description | Criticality | Assigned Criticality |
|---|---|---|---|---|---|---|
| >>CHOICE DUF Slot Configuration | M | | | | — | |
| >>>Explicit Format | | | | | — | |
| >>>>Permutation | M | | ENUMERATED (DFU, UFD, . . .) | | — | |
| >>>>Number of Downlink Symbols | O | | INTEGER (0 . . . 14) | | — | |
| >>>>Number of Uplink Symbols | O | | INTEGER (0 . . . 14) | | — | |
| >>>Implicit Format | | | | | — | |
| >>>>DUF Slot Format Index | M | | INTEGER (0 . . . 254) | Index, excluding the last row | — | |
| HSNA Transmission Periodicity | M | | ENUMERATED (ms0p5, ms0p625, ms1, ms1p25, ms2, ms2p5, ms5, ms10, ms20, ms40, ms80, ms160, . . .) | | YES | reject |
| HSNA Slot Configuration List | | 0 . . . 1 | | | | |
| >HSNA Slot Configuration Item | | 1 . . . <maxnoofHSNASlots> | | | | |
| >>HSNA Downlink | O | | ENUMERATED (HARD, SOFT, NOTAVAILABLE) | HSNA value for downlink symbols in a slot. | — | |
| >>HSNA Uplink | O | | ENUMERATED (HARD, SOFT, NOTAVAILABLE) | HSNA value for uplink symbols in a slot. | — | |
| >>HSNA Flexible | O | | ENUMERATED (HARD, SOFT, NOTAVAILABLE) | HSNA value for flexible symbols in a slot. | — | |
| >>HSNA Frequency | O | | ENUMERATED (HARD, SOFT, NOTAVAILABLE) | HSNA value for frequency resources in a symbol/slot. | — | |

In the table, information related to "DUF Slot Configuration Item" may explicitly/implicitly inform the first slot format for the DU. Information related to "HSNA Slot Configuration Item" may inform time domain HSNA configuration information and frequency domain HSNA configuration information. For example, 'HSNA Downlink' indicates HSNA values for downlink symbols in a slot, 'HSNA Uplink' indicates HSNA values for uplink symbols in a slot, 'HSNA Flexible' indicates HSNA values for flexible symbols in a slot. 'HSNA Frequency' indicates an HSNA value for frequency resources in a slot/symbol.

In the table, frequency domain HSNA information (e.g., 'HSNA Frequency') and time domain HSNA information ('HSNA Downlink, 'HSNA Uplink', 'HSNA Flexible') are provided together within the same gNB-DU cell resource configuration, as an example, it may be provided by a separate gNB-DU cell resource configuration.

Alternatively, the frequency domain HSNA information may be provided by a higher layer message (e.g., an RRC message or a MAC message) of a form/name other than gNB-DU cell resource configuration.

The IAB node receives the second slot format information for the MT (S202). The IAB node may receive the second slot format information from, for example, a parent node or a centralized unit (CU).

For example, for each serving cell, the IAB-MT may be provided with the slot format (=second slot format information) for each slot by a higher layer message (e.g., 'tdd-UL-DL-ConfigDedicated-IAB-MT', which is an RRC message).

TABLE 7

```
-- ASN1START
-- TAG-TDD-UL-DL-CONFIGDEDICATED-START
TDD-UL-DL-ConfigDedicated ::=                    SEQUENCE {
    slotSpecificConfigurationsToAddModList           SEQUENCE (SIZE (1..maxNrofSlots)) OF TDD-UL-DL-SlotConfig
    OPTIONAL, -- Need N
    slotSpecificConfigurationsToReleaseList          SEQUENCE (SIZE (1..maxNrofSlots)) OF TDD-UL-DL-SlotIndex
    OPTIONAL, -- Need N
    ...
}
TDD-UL-DL-ConfigDedicated-IAB-MT-r16 ::=          SEQUENCE {
    slotSpecificConfigurationsToAddModList-IAB-MT-r16      SEQUENCE (SIZE (1..maxNrofSlots)) OF
    IAB-MT-r16   OPTIONAL, -- Need N
    slotSpecificConfigurationsToReleaseList-IAB-MT-r16     SEQUENCE (SIZE (1..maxNrofSlots)) OF TDD-UL-DL-SlotIndex
    OPTIONAL, -- Need N
    ...
}
```

TABLE 7-continued

```
TDD-UL-DL-SlotConfig ::=            SEQUENCE {
    slotIndex                           TDD-UL-DL-SlotIndex,
    symbols                             CHOICE {
        allDownlink                         NULL,
        allUplink                           NULL,
        explicit                            SEQUENCE {
            nrofDownlinkSymbols                     INTEGER (1..maxNrofSymbols-1)
OPTIONAL, -- Need S
            nrofUplinkSymbols                       INTEGER (1..maxNrofSymbols-1)
OPTIONAL -- Need S
        }
    }
}
TDD-UL-DL-SlotConfig-IAB-MT-r16::=   SEQUENCE {
    slotIndex-r16                        TDD-UL-DL-SlotIndex
    symbols-IAB-MT-r16                   CHOICE {
        allDownlink-r16                      NULL,
        allUplink-r16                        NULL,
        explicit-r16                         SEQUENCE {
            nrofDownlinkSymbols-r16                  INTEGER (1..maxNrofSymbols-1)
OPTIONAL, -- Need S
            nrofUplinkSymbols-r16                    INTEGER (1..maxNrofSymbols-1)
OPTIONAL   -- Need S
        },
        explicit-IAB-MT-r16                  SEQUENCE {
            nrofDownlinkSymbols-r16                  INTEGER (1..maxNrofSymbols-1)
OPTIONAL, -- Need S
            nrofUplinkSymbols-r16                    INTEGER (1..maxNrofSymbols-1)
OPTIONAL   -- Need S
        }
    }
}
TDD-UL-DL-SlotIndex ::=              INTEGER (0..maxNrofSlots-1)
-- TAG-TDD-UL-DL-CONFIGDEDICATED-STOP
-- ASN1STOP
```

According to the above table, a set of slot configurations according to 'slotSpecificConfigurationsToAddModList-IAB-MT' may be provided. For each slot configuration of the set of slot configurations, a set of a slot index for a slot provided by 'slotIndex', a symbol for a slot by 'symbol-IAB-MT', etc. may be provided. When 'symbol-IAB-MT' is 'allDownlink', all symbols of the slot are downlink, and when 'allUplink', all symbols of the slot are uplink.

In the case of 'symbols-IAB-MT=explicit', 'nrofDownlinkSymbols' provides the number of first downlink symbols in the slot and 'nrofUplinkSymbols' provides the number of last uplink symbols in the slot. If 'nrofDownlinkSymbols' is not provided, there are no first downlink symbols in the slot, and if 'nrofUplinkSymbols' is not provided, it may mean that there are no last uplink symbols in the slot. The remaining symbols of the slot are flexible symbols. For example, if 14 symbols included in the slot are sequentially 'DDDDDFFFFFUUUU', nrofDownlinkSymbols'=5 and 'nrofUplinkSymbols'=4 may be provided.

If 'symbols-IAB-MT=explicit-IAB-MT', 'nrofUplinkSymbols' provides the number of first uplink symbols in the slot and 'nrofDownlinkSymbols' provides the number of last downlink symbols in the slot. If 'nrofUplinkSymbols' is not provided, it may mean that there are no first uplink symbols in the slot, and if 'nrofDownlinkSymbols' is not provided, it may mean that there are no last downlink symbols in the slot. The remaining symbols of the slot are flexible symbols.

For the serving cell of IAB-MT, IAB-MT may receive, the number of symbols not to be used for IAB-MT (the number of guard symbols) in the slots where the IAB node switches between IAB-MT and IAB-DU, and SCS configuration in the number of symbols, by MAC CE.

The MT of the IAB node is provided with a list of slot format combinations applicable to one serving cell by 'SlotFormatCombinationsPerCell-IAB-MT', and a configuration for monitoring DCI format 2_0 indicating a slot format combination may be provided by 'SlotFormatIndicator-IAB-MT'. The slot format indicator (SFI) field of DCI format 2_0 may indicate one slot format to the MT of the IAB node in the slot formats of the following table.

The following table illustrates the slot format in the normal CP. In DCI format 2_0, the SFI field for IAB-MT may indicate one of the slot formats of Table 8 to the IAB-MT.

TABLE 8

| Slot   | Symbol number in a slot | | | | | | | | | | | | | |
|--------|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |

TABLE 8-continued

| Slot Format | \multicolumn{14}{c}{Symbol number in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | F | D | D |
| 82 | U | U | U | U | U | U | U | U | U | F | F | F | D | D |
| 83 | U | U | U | U | U | U | U | U | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | F | D |
| 94 | U | U | U | U | U | U | F | F | F | F | F | F | D | D |
| 95 | U | U | U | U | L | U | F | F | D | D | D | D | D | D |
| 96 | U | U | U | U | U | U | U | D | D | D | D | D | D | D |

The MT of the IAB node may be provided with the number of symbols (or numbers) not used by the MT of the IAB node by 'guard-SymbolsProvided', in the symbols, the IAB node may perform a transition between the MT and the DU. The SCS configuration for the number of symbols may be provided by 'guardSymbol-SCS'.

The IAB node determines operation resources of the MT and DU based on at least one of the first slot format information, the time domain HSNA information, the frequency domain HSNA information, and the second slot format information (S203).

Here, each of the first slot format information and the second slot format information may be information indicating a downlink symbol, an uplink symbol, and a flexible symbol in a slot, as described above.

The time domain HSNA information may be information indicating that a symbol, which is a time resource in the slot, is configured as hard (H), soft (S), or unavailable (NA).

The frequency domain HSNA information may be information indicating that a frequency resource in the slot is configured as hard, soft, or unavailable.

In the slot, when the simultaneous operation of the MT and the DU is supported, the operation resources of the MT and the DU may be determined by applying the frequency domain HSNA information (and time domain HSNA information). A case in which the simultaneous operation of the MT and the DU is supported may be a case in which the MT and the DU operate using a frequency domain multiplexing (FDM) scheme.

In the slot, when the simultaneous operation of the MT and the DU is not supported, the operation resources of the MT and the DU may be determined based on the time domain HSNA information without applying the frequency domain HSNA information. A case in which simultaneous operation of the MT and the DU is not supported may be a case in which the MT and the DU operate in a time domain multiplexing (TDM) scheme.

Based on the slots of the IAB-DU cell, a symbol in the slot of the IAB-DU cell may be set as hard, soft, or NA (type) by 'time domain HSNA information'. In addition, the frequency resource of the IAB-DU cell may be set as hard, soft, or NA (type) by 'frequency domain HSNA information'.

First, an example in which the IAB node determines the operation resources of the IAB-DU and the IAB-MT based on the time domain HSNA information in the time resource that does not perform (does not support) simultaneous operation will be described.

When a downlink symbol, an uplink symbol, or a flexible symbol is configured as hard by time domain HSNA information, the IAB-DU cell may respectively transmit, receive, and 'transmit or receive' in the corresponding symbol. That is, in the downlink symbol configured as hard, the IAB-DU cell may perform a transmission operation, in the uplink symbol configured as hard, the IAB-DU cell may perform a reception operation, and in a flexible symbol configured as hard, the IAB-DU cell may perform a transmission or reception operation.

When the downlink, uplink, or flexible symbol is configured as soft by time domain HSNA information, the IAB-DU cell may respectively transmit, receive, and 'transmit or receive' operations on the corresponding symbol only in the following cases.

1) the IAB-MT does not transmit or receive during the symbol of the IAB-DU cell, 2) the IAB-MT transmits or receives during the symbol of the IAB-DU cell, and the transmission or reception during the symbol of the IAB-DU cell is not changed due to the use of the symbol by the IAB-DU, or 3) When the IAB-MT detects DCI format 2_5 having an AI index field value indicating that the symbol configured as soft (soft symbol) is available. That is, when the IAB-MT detects the DCI format 2_5, the IAB-DU may use the soft symbol.

If the symbol is configured as unavailable (NA) by the time domain HSNA information, the IAB-DU neither transmits nor receives the symbol.

At a specific symbol within a slot, if the IAB-DU intends to transmit the SS/PBCH block, PDCCH for specific PDCCH CSS sets configured by 'pdcchConfigSIB1', or periodic CSI-RS, or to receive PRACH or SR, the specific symbol is equivalent to being configured as hard.

Next, an example in which the IAB node determines the operation resources of the IAB-DU and the IAB-MT based on the frequency domain HSNA information in the resources for performing (supporting) simultaneous operation will be described.

When the frequency resource is configured as hard according to the frequency domain HSNA information, the IAB-DU cell may perform transmission and/or reception in the corresponding frequency resource. That is, in the frequency resource configured as hard, the IAB-DU cell may perform a transmission or reception operation without any particular limitation.

When the frequency resource is configured as soft by the frequency domain HSNA information, the IAB-DU cell may perform transmission and/or reception operation in the corresponding frequency resource only in the following cases.

1) IAB-MT does not transmit or receive in the frequency resource of the IAB-DU cell, 2) the IAB-MT transmits or receives in the frequency resource of the IAB-DU cell, and the transmission or reception during the frequency resource of the IAB-DU cell is not changed due to the use of the frequency resource by the IAB-DU, or 3) When the IAB-MT detects DCI format (this may be the existing DCI format 2_5, or a new DCI format) having an AI index field value indicating that the frequency resource configured as soft (soft frequency resource) is available. That is, when the IAB-MT detects the DCI format, the IAB-DU may use the soft frequency resource.

When the frequency resource is configured as unavailable (NA) according to the frequency domain HSNA information, the IAB-DU neither transmits nor receives the frequency resource.

Next, an example of determining the operation resources of the IAB-DU and the IAB-MT based on the time domain HSNA information and the frequency domain HSNA information in the time resource in which the IAB node performs (supports) simultaneous operation will be described.

The IAB-DU does not operate in a time resource that is not operable according to the time domain HSNA information.

With respect to a time resource that is determined to be operable based on the time domain HSNA information, the IAB-DU does not operate on a frequency resource that is not determined to be operable based on the frequency domain HSNA information.

With respect to a time resource determined to be operable based on the time domain HSNA information, the IAB-DU may operate in a frequency resource determined to be operable based on the frequency domain HSNA information.

In this case, the IAB-MT may be operable in a time/frequency resource in which the IAB-DU does not operate.

Figure 21:
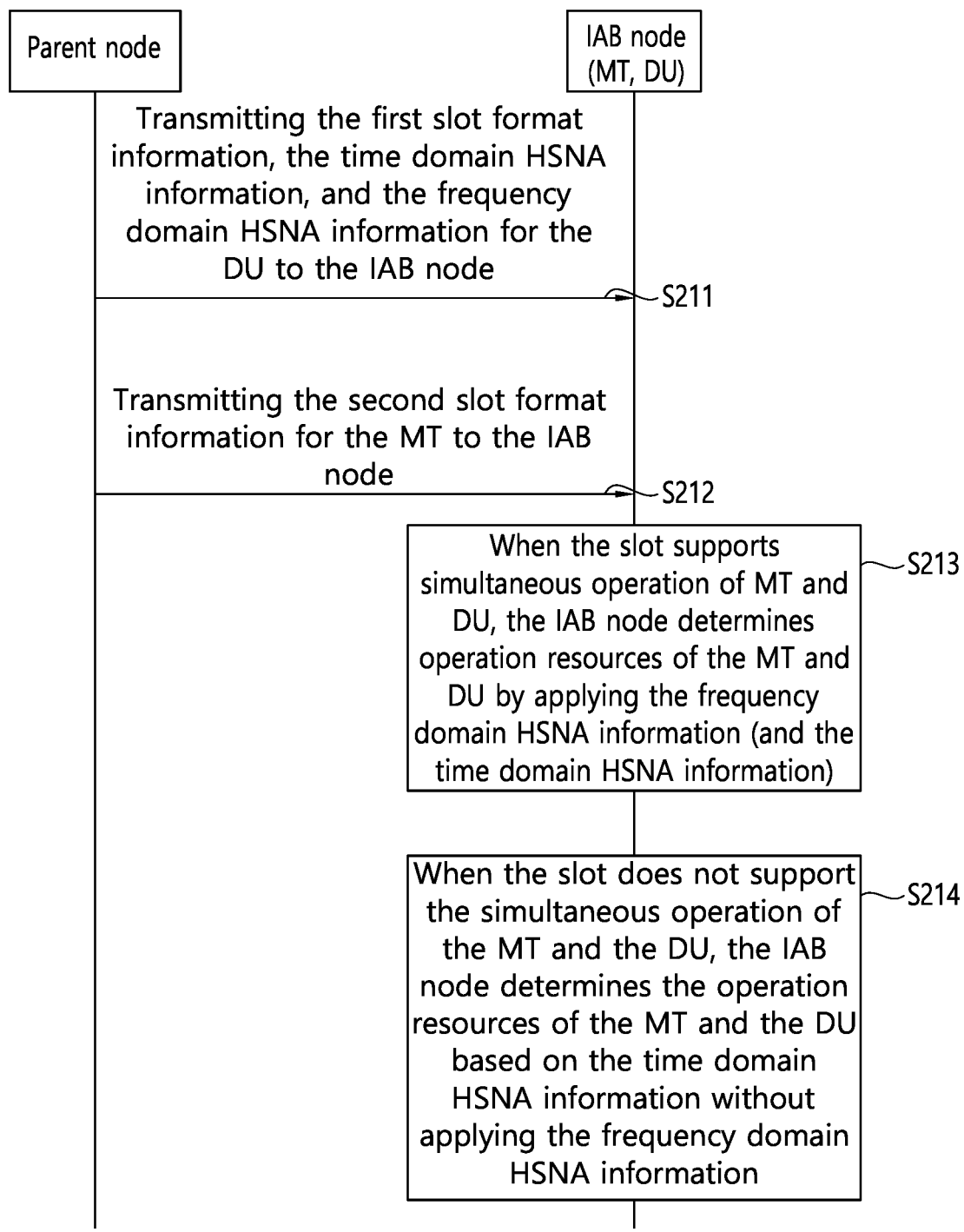
FIG. 21 illustrates signaling and operation between a parent node and an IAB node.

FIG. 21 illustrates signaling and operation between a parent node and an IAB node.

Referring to FIG. 21, the IAB node includes an MT and a DU. The parent node transmits the first slot format information, the time domain HSNA information, and the frequency domain HSNA information for the DU to the IAB node (S211).

The parent node transmits the second slot format information for the MT to the IAB node (S212).

If the slot supports simultaneous operation of MT and DU, the IAB node determines operation resources of the MT and DU by applying the frequency domain HSNA information (and the time domain HSNA information) (S213).

If the slot does not support the simultaneous operation of the MT and the DU, the IAB node determines the operation resources of the MT and the DU based on the time domain HSNA information without applying the frequency domain HSNA information (S214).

In FIG. 21, in terms of the operation of the parent node connected to the IAB node including the MT and DU, the parent node transmits first slot format information, time domain HSNA information, and frequency domain HSNA information for the DU to the IAB node, transmits the second slot format information for the MT to the IAB node. In the operation resources of the MT and the DU determined based on at least one of the first slot format information, the time domain HSNA information, the frequency domain HSNA information, and the second slot format information, the parent node communicates with at least one of the MT and the DU.

B. A Configuration Method of Frequency-Domain H/S/NA

When supporting frequency domain H/S/NA, the configuration method may define, for example, several frequency resource sets similar to the BWP configuration method. Each frequency resource set may correspond to hard, soft, or unavailable. Also, there can be multiple resource sets with soft, and soft resource availability can be indicated for each resource set. In addition, it may be configured whether it can be commonly applied to DL and UL or can be applied differently.

B.1. Frequency-Domain H/S/NA Configurations

A detailed configuration method for H/S/NA information (=frequency domain HSNA information) for a frequency resource of a DU is proposed.

For this, one or a plurality of frequency resource sets may be configured for the DU. This configuration may be set by the donor node/CU to the IAB-DU through F1-AP. Specifically, the frequency resource set may include the following information.

1) Frequency position and width: Information on the starting frequency position and frequency width for setting a continuous frequency range is set. In this method, a method of setting a bandwidth part (BWP) to an existing UE may be reused. That is, when setting the BWP, the method of setting the 'locationAndBandwidth' of the BWP may be applied. Alternatively, the start frequency position (e.g., the start PRB position) and the frequency width (e.g., the number of PRBs) may be set independently. 2) Subcarrier spacing: Indicates the subcarrier spacing assumed for configuration the corresponding frequency resource set. Such a subcarrier spacing may indicate a subcarrier spacing used by a DU in a corresponding frequency resource set. Such a subcarrier spacing may be fixed as a specific parameter without a separate configuration.

The following table shows a specific example of information for configuring a frequency resource set.

TABLE 9

BWP information element

```
-- ASN1START
-- TAG-BWP-START
BWP ::=                    SEQUENCE {
    locationAndBandwidth       INTEGER (0..37949),
    subcarrierSpacing          SubcarrierSpacing,
    cyclicPrefix               ENUMERATED { extended }
    OPTIONAL   -- Need R
}
-- TAG-BWP-STOP
-- ASN1STOP
```

In this case, each frequency resource set may correspond to one of hard, soft, and unavailable (NA). A unit of a frequency resource in which hard, soft, or unavailable (NA) is configured may be various such as a resource element (RE), a resource element group (REG), a control channel element (CCE), a resource block (PRB, VRB), RBG (resource block group), subchannel and BWP, etc.

Alt 1. For this, H/S/NA information may be configured together for each frequency resource set. That is, for each frequency resource set, whether the corresponding resource set is a hard resource, a soft resource, or an NA resource may be configured.

Alt 2. Alternatively, a list of frequency resource sets having each attribute for hard, soft, and NA attributes may be set for this purpose. That is, an index of a frequency resource set that is a hard resource, an index of a frequency resource set that is a soft resource, and an index of a frequency resource set that is an NA resource may be set respectively.

In this case, a plurality of frequency resource sets may have the same attribute.

Alternatively, the frequency resource set and hard (or NA) and soft information may be set as described above only for hard (or NA) and soft, and the remaining frequency resources of DU that are not set may be determined to be NA (or hard).

B.2. Frequency-Domain Availability Indication

In the case of a frequency resource of an IAB-DU configured as soft, availability may be indicated through a frequency-domain availability indication. This frequency-domain availability indication may be information that the parent DU indicates to the IAB-MT as DCI.

Characteristically, the frequency-domain availability indication for a specific IAB-DU cell may be indicated as follows.

Alt a. Availability for all frequency resource sets configured as soft may be indicated. That is, when a plurality of frequency resource sets configured as soft for the IAB-DU exist, one availability information may be indicated and the corresponding information may be equally applied to all frequency resource sets. That is, it may or may not indicate that all frequency resource sets are available.

Alt b. Availability may be indicated in unit of frequency resource set configured as soft. That is, when there are a plurality of frequency resource sets configured as soft in the IAB-DU, one availability information for each frequency resource set is indicated. Therefore, availability may vary for each frequency resource set.

This frequency-domain availability indication may be configured differently in units of slots or in units of multiple slots. Alternatively, the same availability information may be applied to the entire time resource until a time duration in which the frequency-domain availability indication is valid.

Alternatively, the availability of the frequency resource of the IAB-DU configured as soft may be implicitly determined as follows.

When transmission and reception of IAB-DU in a resource configured as soft does not affect transmission/reception operation of IAB-MT, the IAB-DU can perform transmission/reception. This operation may be applied only to soft resources when availability is not indicated by the frequency-domain availability indication.

At this time, the frequency-domain availability indication for the IAB-DU cell may be transmitted through the following DCI. Such DCI may be received from the parent-DU by performing monitoring by the IAB-MT.

Method 1. The availability indication information for the frequency-domain soft resource of the DU may be delivered using DCI format 2_5 for delivering the availability indication information for the time domain soft resource of the existing DU.

Method 2. Independent of DCI format 2_5 for delivering availability indication information for time-domain soft resources of existing DUs, a new DCI format for delivering availability indication information for frequency-domain soft resources of DUs may be used.

In the case of using the existing DCI format 2_5 to deliver the availability indication information for the frequency-domain soft resource of the DU, more specifically, the availability indication information for the frequency-domain soft resource may be delivered in the following way.

Alt a. Transmission through the DCI field independent of the AI index field for the existing DU cell.

Through DCI format 2_5, resource availability information for a time domain soft resource and/or resource availability information for a frequency domain soft resource of an IAB-DU cell may be transmitted. In this case, the resource availability information for the time domain soft resource and the resource availability information for the frequency domain soft resource may be transmitted through independent fields, respectively. In order to determine the position of the availability indicator (AI) index field applied to the corresponding DU cell for each IAB-DU cell, the IAB-DU may receive positionInDCI-AI configured from the network.

Figure 22:
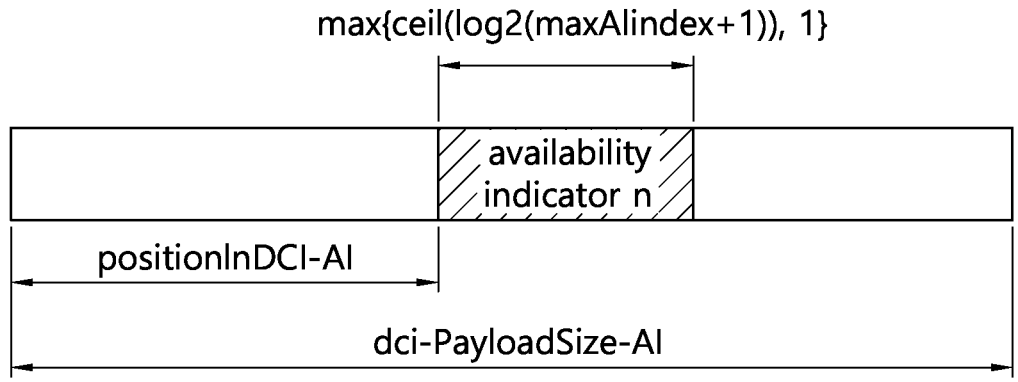
FIG. 22 illustrates a method of determining a start position of an AI index field in DCI format 2_5.

FIG. 22 illustrates a method of determining a start position of an AI index field in DCI format 2_5.

Referring to FIG. 22, the IAB node is configured with 'positionInDCI-AI' and determines the start position of the AI index field applied to the IAB-DU cell in the DCI having the size of 'dci-PayloadSize-AI' by using 'positionInDCI-AI'.

In this case, the position of the field transmitting the frequency domain availability indication information applied to the DU cell may be determined as follows.

Alt a-1. When the field carrying the frequency domain availability indication information applied to the DU cell is called an AI-frequency index field, the IAB-DU receives positionInDCI-AI-freq for each DU-cell from the network to determine the position of the AI-frequency index field applied to each IAB-DU cell. In this case, the IAB-DU may determine the position of the AI-frequency index field applied to the corresponding DU-cell using positionInDCI- AI-freq. This positionInDCI-AI-freq may be a value set independently of the existing positionInDCI-AI.

Alt a-2. When a field carrying frequency domain availability indication information applied to a DU cell is referred to as an AI-frequency index field, the AI-frequency index field may be the same as the next field of the AI index field for the time domain soft resource determined by position-InDCI-AI. That is, when the AI index field for the DU cell is determined using the existing positionInDCI-AI within DCI (DCI format 2_5), the next field of the AI index field may be the AI-frequency index field of the corresponding DU cell. Expressed differently, positionInDCI-AI-freq may be equal to positionInDCI-AI+max {ceil(log 2(maxAIIndex+1)),1}. maxAIindex is the maximum value provided by availabilityCombinationId. availabilityCombinationId may be configured specifically for the IAB node by a higher layer. That is, in the DCI (DCI format 2_5), the next field based on the first field indicating the time domain availability indication for the symbol may be the second field indicating the frequency domain availability indication for the frequency resource.

Instead of explicitly notifying the position of the AI-frequency index field, it can be said to be a method of implicitly notifying the position of the AI-frequency index field based on the position of the AI index field.

Alt b. It may be transmitted in the same field as the AI index field for the existing DU cell.

Resource availability information for time domain soft resources and/or resource availability information for frequency domain soft resources of an IAB-DU cell may be transmitted in DCI format 2_5. In this case, resource availability information for time domain soft resources and resource availability information for frequency domain soft resources are transmitted through the same field. More specifically, resource availability information for time domain soft resources and/or resource availability information for frequency domain soft resources may be transmitted within the same field as follows.

That is, when a symbol is set to soft, the MT may receive a time domain availability indication for the symbol through downlink control information (DCI). When a frequency resource is set to soft, the MT may receive a frequency domain availability indication for the frequency resource through the DCI. That is, one field of the DCI can inform both the time domain availability indication for the symbol and the frequency domain availability indication for the frequency resource. More specific methods are described in Alt b-1 and b-2.

Hereinafter, 'AvailabilityCombinationsPerCell' may be used to set AvailabilityCombinations applicable to a cell of an IAB DU.

Alt b-1. A plurality (e.g., two) of 'availabilityCombinations' can be set in 'AvailabilityCombinationsPerCell'. That is, a plurality (two) of 'availabilityCombinations' linked to one 'positionInDCI-AI' may be set. One 'availabilityCombinations' includes resource availability information for time-domain soft resources, and the other 'availabilityCombinations' includes resource availability information for frequency-domain soft resources. For example, 'availabilityCombinations-freq' can be added in addition to the existing 'availabilityCombinations'. At this time, 'availabilityCombinations-freq' delivers resource availability information on frequency domain soft resources of the DU-cell. In this case, the size of the AI index field may increase compared to the existing DCI format 2_5, but independent availability information may be provided in the time domain and in the frequency domain.

The following table is an example of 'AvailabilityCombinationsPerCell' according to Alt b-1.

TABLE 10

```
-- ASN1START
-- TAG-AVAILABILITYCOMBINATIONSPERCELL-START
AvailabilityCombinationsPerCell-r16 ::=      SEQUENCE {
    availabilityCombinationsPerCellIndex-r16     AvailabilityCombinationsPerCellIndex-r16,
    iab-DU-CellIdentity-r16                      CellIdentity,
    positionInDCI-AI-r16                              INTEGER(0..maxAI-DCI-PayloadSize-r16-1)
OPTIONAL, -- Need M
    availabilityCombinations-r16                     SEQUENCE (SIZE (1..maxNrofAvailabilityCombinationsPerSet-r16)) OF
AvailabilityCombination-r16,
    availabilityCombinations-freq-r16                SEQUENCE (SIZE (1..maxNrofAvailabilityCombinationsPerSet-freq-r16))
OF AvailabilityCombination-freq-r16,
    ...
}
AvailabilityCombinationsPerCellIndex-r16 ::= INTEGER(0..maxNrofDUCells-r16)
AvailabilityCombination-r16 ::=              SEQUENCE {
    availabilityCombinationId-r16                AvailabilityCombinationId-r16,
    resourceAvailability-r16                         SEQUENCE (SIZE (1..maxNrofResourceAvailabilityPerCombination-r16)) OF
INTEGER (0..7)
AvailabilityCombination-freq-r16 ::=         SEQUENCE {
    availabilityCombinationId-freq-r16           AvailabilityCombinationId-freq-r16,
    resourceAvailability-freq-r16                    SEQUENCE (SIZE (1..maxNrofResourceAvailabilityPerCombination-freq-r16))
OF INTEGER (0..N), N may be 7 for example.
}
AvailabilityCombinationId-r16 ::=            INTEGER (0..maxNrofAvailabilityCombinationsPerSet-r16-1)
AvailabilityCombinationId-freq-r16 ::=       INTEGER (0..maxNrofAvailabilityCombinationsPerSet-freq-r16-1)
-- TAG-AVAILABILITYCOMBINATIONSPERCELL-STOP
-- ASN1STOP
```

In the above table, 'resourceAvailability' represents the resource availability of soft resources in the time domain (e.g., 0 means no resource available among soft symbols, 1 means downlink soft symbols are available, 2 means uplink soft symbols available, 3 downlink and uplink soft symbols available, 4 flexible soft symbols available, 5 downlink and flexible symbols available, 6 uplink and flexible symbols available, 7 is downlink, uplink and flexible symbols are available), 'resourceAvailability-freq' may indicate resource availability of soft resources in the frequency domain (each of a plurality of values may represent availability of distinct frequency soft resources).

'availabiltyCombinationId' is used to dynamically select 'AvailabilityCombination' in DCI format 2_5 payload.

Alt b-2. A plurality of 'resourceAvailability' (e.g., two) may exist in 'availabilityCombinations'. That is, a plurality of 'resourceAvailability' linked to one 'availabilityCombinationId' may exist (e.g., two). In this case, one 'resourceAvailability' includes resource availability information for time-domain soft resources, and the other 'resourceAvailability' includes resource availability information for frequency-domain soft resources. For example, 'resourceAvailability-freq' can be added in addition to the existing 'resourceAvailability' within 'availabilityCombinations'. At this time, 'resourceAvailability-freq' delivers resource availability information on frequency domain soft resources of the DU-cell. In this case, there is no need to change the size of the existing AI index field of the existing DCI format 2_5, and the impact on the standard specification may be small. Scheduling flexibility may be small, but there may be advantages in terms of signaling overhead.

The following table is an example of 'AvailabilityCombinationsPerCell' according to Alt b-2.

the MT through a first DCI (e.g., the existing DCI format 2_5), when the frequency resource is set to soft, the MT receives the frequency domain availability indication for the frequency resource through a second DCI (e.g., a new DCI format different from the existing DCI format 2_5), and the first DCI and the The second DCI may be different DCIs.

B.3. Frequency-Domain H/S/NA Configurations DL and UL

In the case of an unpaired spectrum in the current NR, the UL BWP and DL BWP of the UE are set independently. For FDM operation between IAB-DU and IAB-MT, it is necessary to determine whether to provide independent H/S/NA information or apply the same H/S/NA information to DL and UL resources.

First, the same H/S/NA information may be configured for DL resources and UL resources. That is, the frequency-domain H/S/NA configuration is equally applied regardless of DL and UL resources of the DU. In this case, the parent-DU can determine the usable frequency resources of the IAB-MT without ambiguity about the actual resource direction in DU flexible resources.

Meanwhile, independent H/S/NA information may be configured for DL resources and UL resources. In this case,

TABLE 11

```
-- ASN1START
-- TAG-AVAILABILITYCOMBINATIONSPERCELL-START
AvailabilityCombinationsPerCell-r16 ::=        SEQUENCE {
    availabilityCombinationsPerCellIndex-r16      AvailabilityCombinationsPerCellIndex-r16,
    iab-DU-CellIdentity-r16                       CellIdentity,
    positionInDCI-AI-r16                              INTEGER(0..maxAI-DCI-PayloadSize-r16-1)
OPTIONAL, -- Need M
    availabilityCombinations-r16                  SEQUENCE (SIZE (1..maxNrofAvailabilityCombinationsPerSet-r16)) OF
AvailabilityCombination-r16,
    ...
}
AvailabilityCombinationsPerCellIndex-r16 ::= INTEGER(0 . . . maxNrofDUCells-r16)
AvailabilityCombination-r16 ::=              SEQUENCE {
    availabilityCombinationId-r16                 AvailabilityCombinationId-r16,
    resourceAvailability-r16                       SEQUENCE (SIZE (1..maxNrofResourceAvailabilityPerCombination-r16)) OF
INTEGER (0..7)
    resourceAvailability-freq-r16                  SEQUENCE (SIZE (1..maxNrofResourceAvailabilityPerCombination-r16)) OF
INTEGER (0..N), N may be 7 for example.
}
AvailabilityCombinationId-r16 ::=            INTEGER (0..maxNrofAvailabilityCombinationsPerSet-r16-1)
-- TAG-AVAILABILITYCOMBINATIONSPERCELL-STOP
-- ASN1STOP
```

Alt c. A method for transmitting it as an independent DCI.

In order to convey the availability indication information for the frequency-domain soft resources of the DU, the existing DCI format 2_5 is used, but the resource availability information for the time-domain soft resources and the resource availability information for the frequency-domain soft resources of the IAB-DU cell is transmitted through an independent DCI. To this end, in detail, the IAB-DU may be configured with an AI-RNTI (e.g., AI-Freq-RNTI) independent of the existing AI-RNTI. At this time, the DCI detected by the existing AI-RNTI delivers resource availability information on the time domain soft resources of the IAB-DU cell, DCI detected by AI-Freq-RNTI delivers resource availability information on frequency-domain soft resources of the IAB-DU cell. That is, the IAB-MT receives availability indication information for frequency-domain soft resources of the DU-cell using AI-Freq-RNTI. At this time, 'positionInDCI-AI-freq' for the DU-cell is set in order to receive the availability indication for the frequency domain resource of the DU-cell. At this time, the IAB-DU uses 'positionInDCI-AI-freq' to determine the position of the AI-frequency index field applied to the corresponding DU-cell.

For example, when a symbol is set to soft, the time domain availability indication for the symbol is received by frequency-domain H/S/NA configuration may be independently configured for DL and UL. That is, frequency resource sets in downlink and frequency resource sets in uplink may be independently set, and H/S/NA information in each resource set may be independently set.

In this case, the IAB-DU shall determine usable frequency resources based on its own resource direction. The IAB-MT also needs to determine the frequency resources it can operate in consideration of the resource direction of the IAB-DU.

Throughout this specification, the term UE (terminal, UE, MS, etc.) may be equally applied to the IAB-MT of an IAB node.

A procedure for performing a cell search, system information acquisition, or random access procedure by the IAB-MT may be the same as that for the UE except for the following.

For initial cell selection, the IAB-MT may assume that half frames with SS/PBCH blocks occur in a cycle of 16 frames.

In the case of PRACH transmission, the IAB-MT may determine a frame containing a PRACH occasion and a subframe/slot within the frame.

The IAB-MT may determine an association period for mapping an SS/PBCH block to a PRACH occasion based on a PRACH configuration period. The association pattern period includes one or more association periods, and a pattern between PRACH occasions and SS/PBCH blocks may be determined to be repeated every 640 millisecond at maximum. A PRACH occasion of a PRACH slot may be valid if certain conditions are satisfied.

The slot format for IAB-DU or IAB-MT includes downlink symbols, uplink symbols, and flexible symbols.

The IAB node performs (/supports) simultaneous operation between the IAB-MT and the IAB-DU, or determines the operating frequency resource of the IAB-DU and the IAB-MT (of frequency domain HSNA information and time domain HSNA information, i) only frequency domain HSNA information may be used, or ii) both frequency domain HSNA information and time domain HSNA information may be used) by applying frequency domain HSNA information to time resources (for example, a time resource that operates as FDM or does not operate as TDM between IAB-MT and IAB-DU).

In addition, the IAB node may determine the operating frequency resources of the IAB-DU and IAB-MT based on the time-domain HSNA information without considering the frequency-domain HSNA information in time resources that do not perform (or support) simultaneous operations (e.g., a time resource that does not perform FDM or operates as TDM between IAB-MT and IAB-DU).

Additional advantages, objects, and features of the present disclosure will be set forth in part in the following description and in part will become apparent to those skilled in the art from a review of the following or may be learned from practice of the present disclosure. The objectives and other advantages of the present disclosure may be realized and attained by the structure particularly pointed out in the description and claims set forth herein, as well as in the accompanying drawings.

The configuration, operation and other features of the present disclosure will be understood by the embodiments of the present disclosure described with reference to the accompanying drawings.

Figure 23:
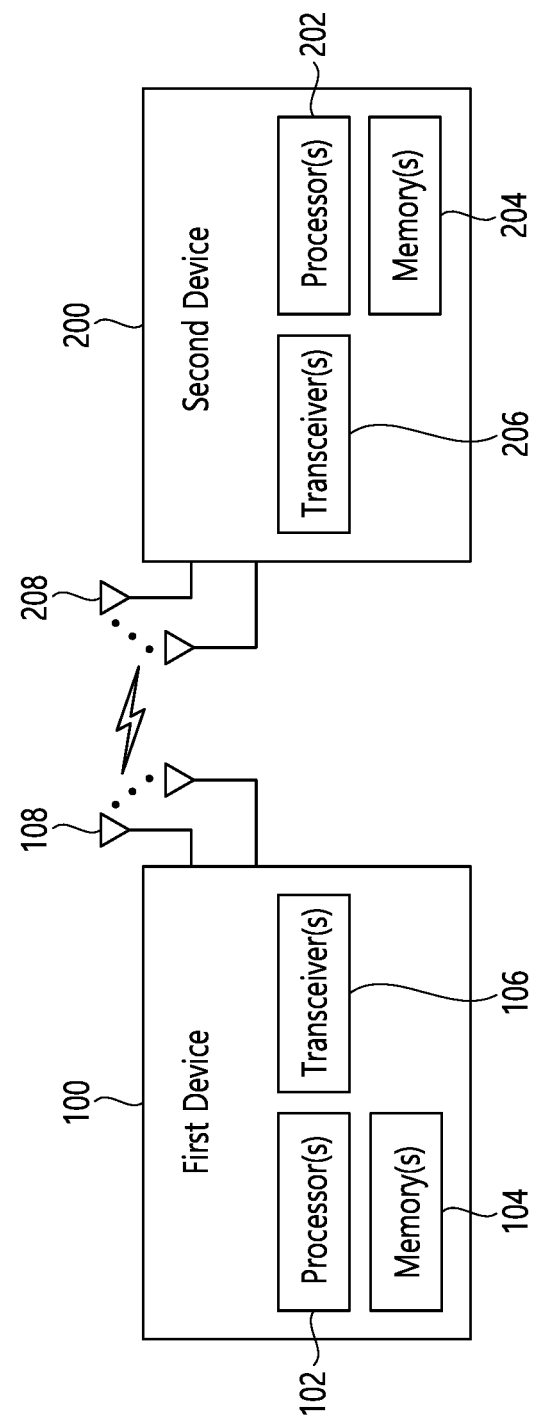
FIG. 23 illustrates an example of a wireless communication device for implementing the present disclosure.

FIG. 23 illustrates a wireless device applicable to the present specification.

Referring to FIG. 23, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202.

The one or more processors 102 and 202 may be implemented with at least one computer readable medium (CRM) including instructions to be executed by at least one processor.

That is, at least one computer readable medium (CRM) having an instruction to be executed by at least one processor to perform operations includes: receiving first slot format information, time domain HSNA information, and frequency domain HSNA information for the DU, receiving second slot format information for the MT, determining operation resources of the MT and the DU based on at least one of the first slot format information, the time domain HSNA information, the frequency domain HSNA information, and the second slot format information, when the slot supports a simultaneous operation of the MT and the DU, the operation resources of the MT and the DU are determined with applying the frequency domain HSNA information, and when the slot does not support the simultaneous operation of the MT and the DU, the operation resources of the MT and the DU are determined without applying the frequency domain HSNA information.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
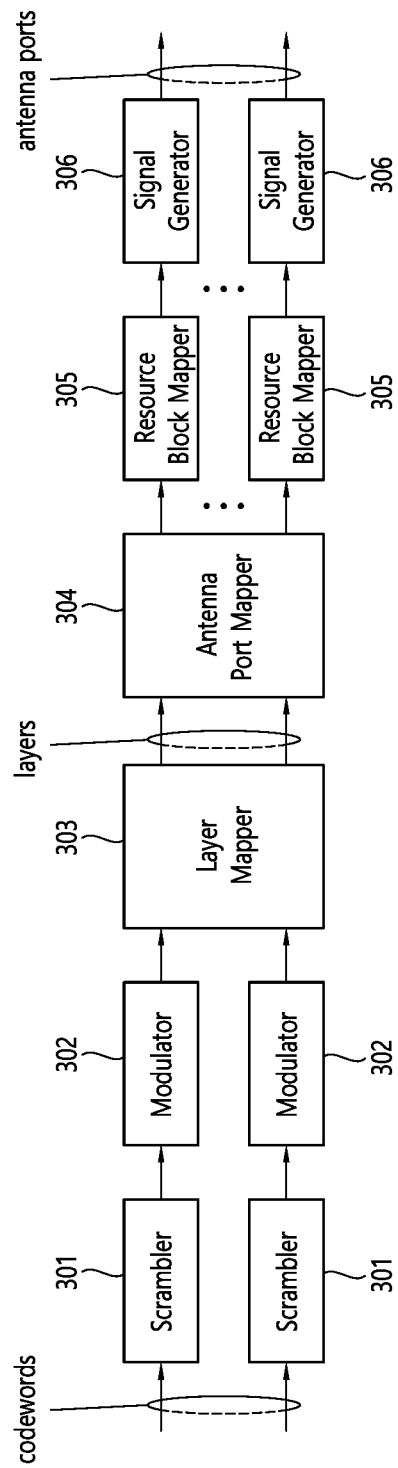
FIG. 24 shows an example of the structure of a signal processing module.

FIG. 24 shows an example of a structure of a signal processing module. Herein, signal processing may be performed in the processors 102 and 202 of FIG. 23.

Referring to FIG. 24, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303.

Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 25:
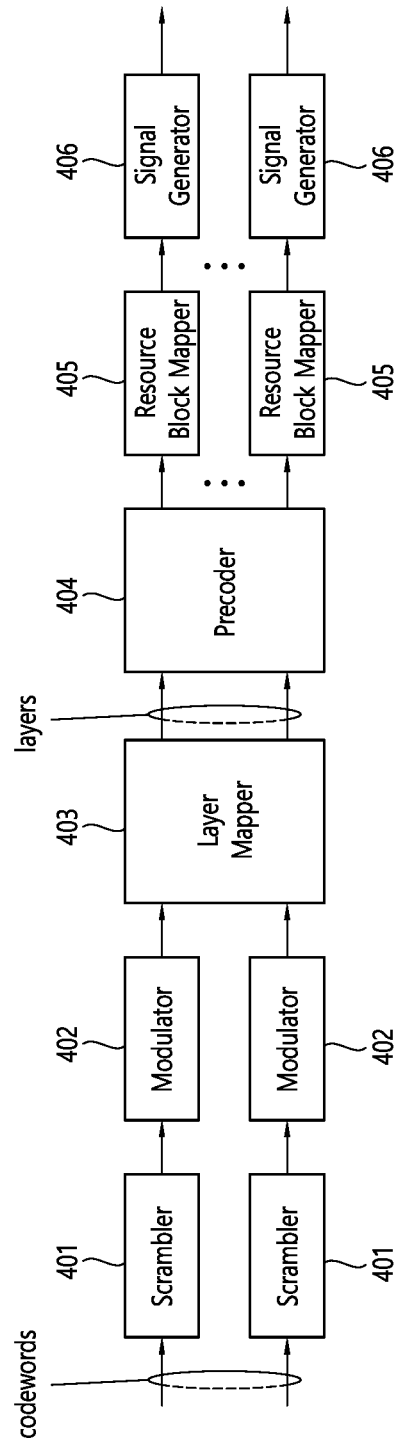
FIG. 25 shows another example of the structure of a signal processing module in a transmission device.

FIG. 25 shows another example of a structure of a signal processing module in a transmitting device. Herein, signal processing may be performed in a processor of a UE/BS, such as the processors 102 and 202 of FIG. 23.

Referring to FIG. 25, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 26:
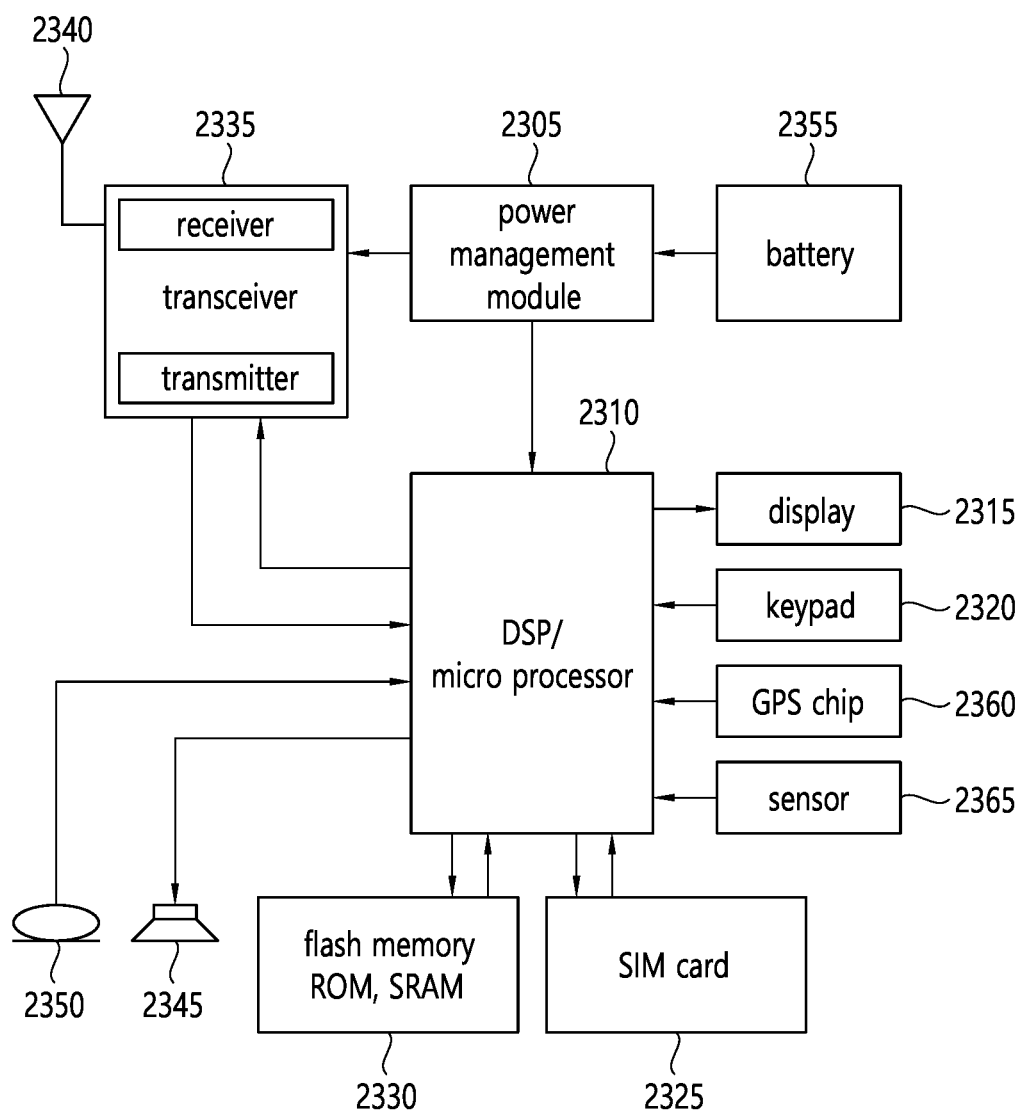
FIG. 26 illustrates an example of a wireless communication device according to an embodiment of the present disclosure.

FIG. 26 illustrates an example of a wireless communication device according to an implementation example of the present disclosure.

Referring to FIG. 26, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 26 may be the processors 102 and 202 in FIG. 23.

The memory 2330 is connected to the processor 2310 and stores information related to operations of the processor. The memory may be located inside or outside the processor and connected to the processor through various techniques such as wired connection and wireless connection. The memory 2330 in FIG. 26 may be the memories 104 and 204 in FIG. 23.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 26 may be the transceivers 106 and 206 in FIG. 23.

Although not shown in FIG. 26, various components such as a camera and a universal serial bus (USB) port may be additionally included in the UE. For example, the camera may be connected to the processor 2310.

FIG. 26 is an example of implementation with respect to the UE and implementation examples of the present disclosure are not limited thereto. The UE need not essentially include all the components shown in FIG. 26. That is, some of the components, for example, the keypad 2320, the GPS chip 2360, the sensor 2365 and the SIM card 2325 may not be essential components. In this case, they may not be included in the UE.

Figure 27:
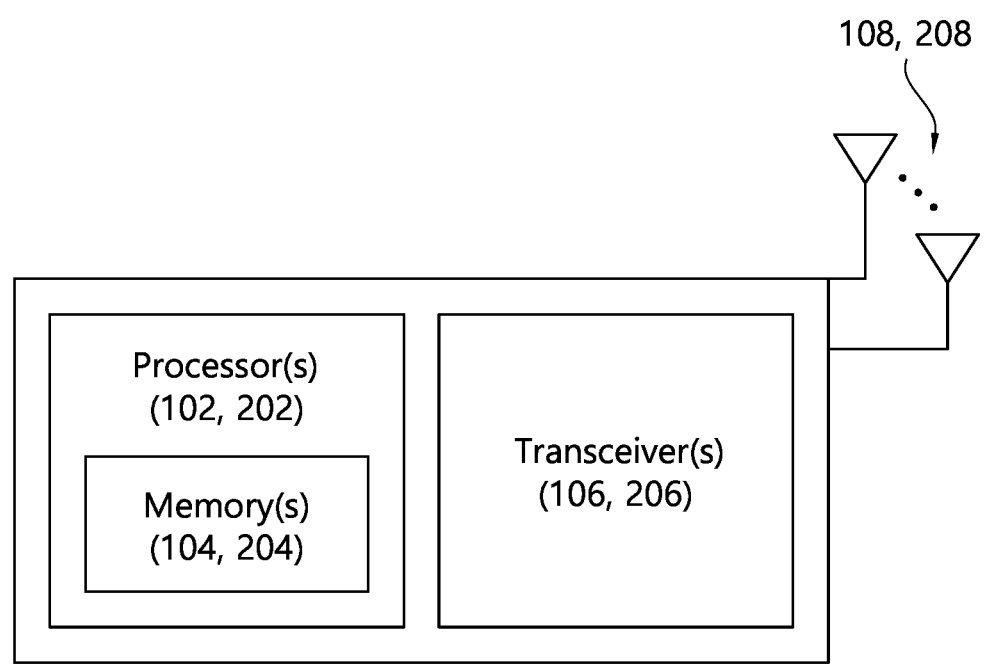
FIG. 27 shows another example of a wireless device.

FIG. 27 shows another example of a wireless device.

Referring to FIG. 27, the wireless device may include one or more processors 102 and 202, one or more memories 104 and 204, one or more transceivers 106 and 206 and one or more antennas 108 and 208.

The example of the wireless device described in FIG. 27 is different from the example of the wireless described in FIG. 23 in that the processors 102 and 202 and the memories 104 and 204 are separated in FIG. 23 whereas the memories 104 and 204 are included in the processors 102 and 202 in the example of FIG. 27. That is, the processor and the memory may constitute one chipset.

Figure 28:
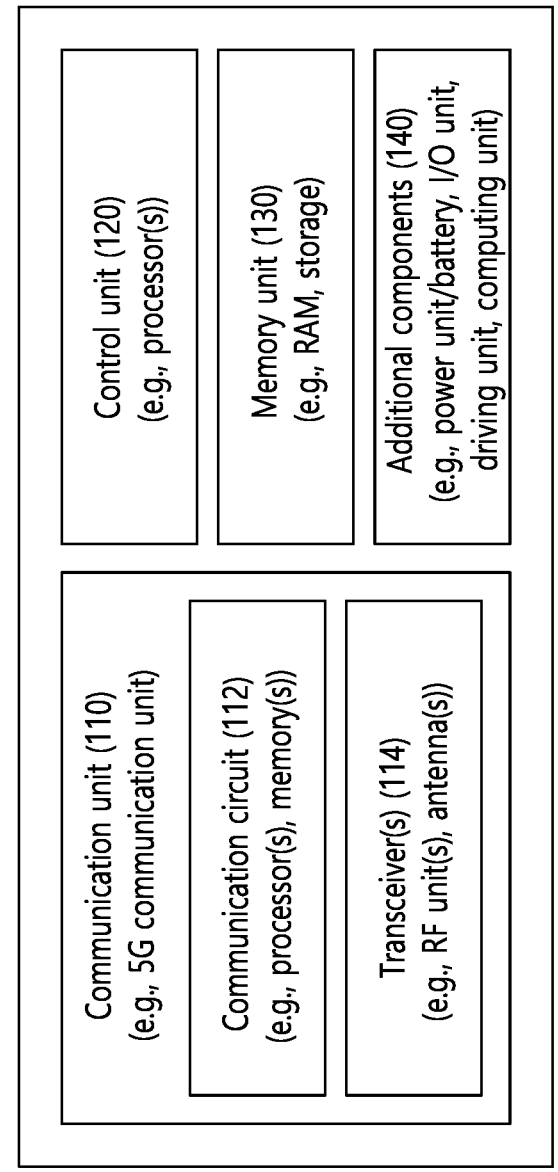
FIG. 28 shows another example of a wireless device applied to the present specification.

FIG. 28 shows another example of a wireless device applied to the present specification. The wireless device may be implemented in various forms according to a use-case/service.

Referring to FIG. 28, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot, the vehicles, the XR device, the hand-held device, the home appliance, the IoT device, a digital broadcast UE, a hologram device, a public safety device, an MTC device, a medicine device, a fintech device (or a finance device), a security device, a climate/environment device, the AI server/device, the BSs, a network node, etc. The wireless device may be used in a mobile or fixed place according to a use-example/service.

Figure 29:
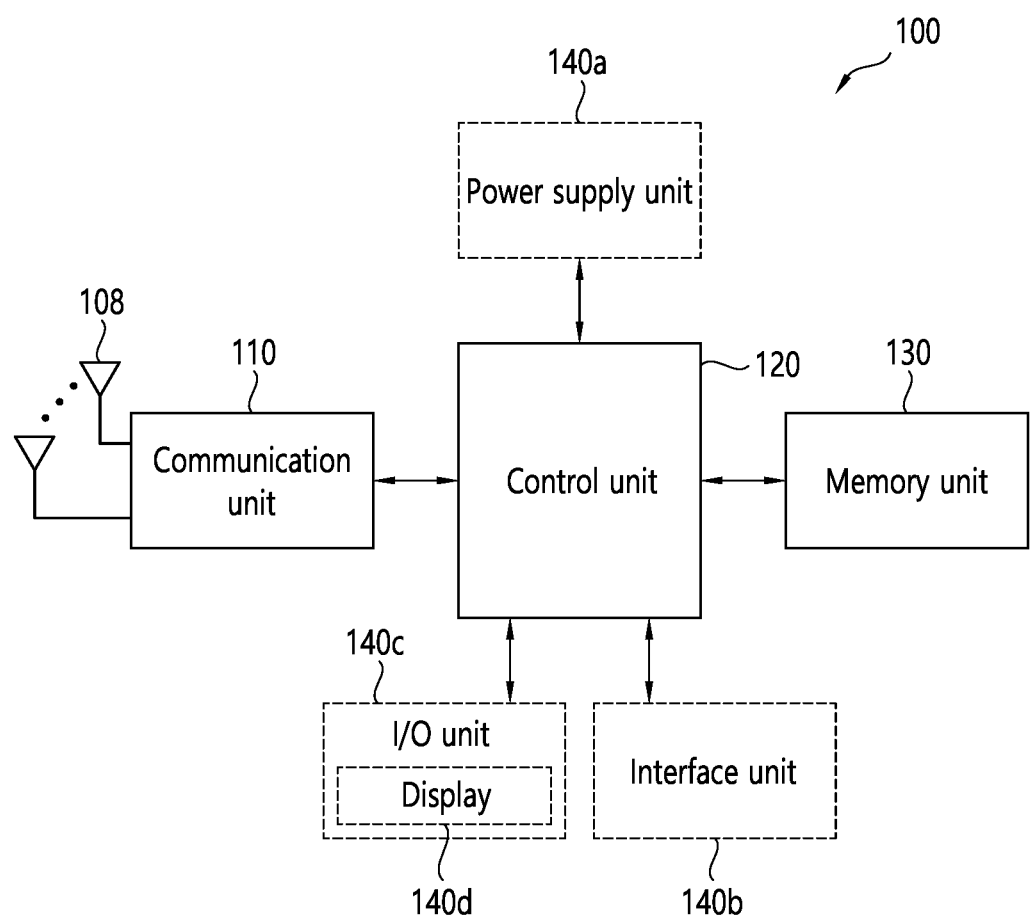
FIG. 29 illustrates a hand-held device applied to the present specification.

FIG. 29 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 28.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 12. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 12

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 13 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 13

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method comprising:
receiving, by an integrated access and backhaul-distributed unit (IAB-DU) of an IAB node including an IAB-mobile terminal (IAB-MT) and the IAB-DU, information related to a resource configuration comprising time domain hard, soft, unavailable (HSNA) information, frequency domain HSNA information and subcarrier spacing information; and
performing, by the IAB-DU, an operation based on the information related to the resource configuration,
wherein a symbol in a slot is configured to be of hard (H), soft(S), or unavailable (NA) by the time domain HSNA information,
wherein the IAB-DU is configured with at least one frequency resource set,
wherein the IAB-DU is provided an indication of hard (H), soft(S) or unavailable (NA) per frequency resource set among the at least one frequency resource set by the frequency domain HSNA information,
wherein the subcarrier spacing information is related to a subcarrier spacing used as reference for a slot configuration, and
wherein availability of soft resources for each frequency resource set group is provided for the IAB-DU.

2. The method of claim 1, wherein based on the IAB node using a simultaneous transmission and reception in the slot, the IAB-DU applies a configuration of hard (H), soft(S), or unavailable (NA) provided by the frequency domain HSNA information.

3. The method of claim 1, wherein based on the symbol being configured as soft(S), the IAB-MT receives a time domain availability indication for the symbol through downlink control information (DCI).

4. The method of claim 3, wherein based on a frequency resource being configured as soft(S), the IAB-MT receives a frequency domain availability indication for the frequency resource through the DCI.

5. The method of claim 4, wherein one field of the DCI is related to both the time domain availability indication for the symbol and the frequency domain availability indication for the frequency resource.

6. The method of claim 4, wherein, in the DCI, a first field is related to the time domain availability indication for the symbol and a second field is related to the frequency domain availability indication for the frequency resource.

7. The method of claim 6, further comprising:
receiving information for a location of the second field.

8. The method of claim 1, wherein the IAB node is configured with availability combinations for a time domain soft resource and availability combinations for a frequency domain soft resource.

9. An integrated access and backhaul (IAB) node including an IAB-mobile terminal (IAB-MT) and an IAB-distributed unit (IAB-DU), the IAB node comprising:
at least one transceiver;
at least one memory; and
at least one processor operably connectable to at least one transceiver and the at least one memory, wherein the at least one memory stores instructions that, based on being executed by the at least one processor, cause the at least one processor to perform operations comprising:

receiving information related to a resource configuration comprising time domain hard, soft, unavailable (HSNA) information, frequency domain HSNA information and subcarrier spacing information; and performing an operation based on the information related to the resource configuration, wherein a symbol in a slot is configured to be of hard (H), soft(S), or unavailable (NA) by the time domain HSNA information, wherein the IAB-DU is configured with at least one frequency resource set, wherein the IAB-DU is provided an indication of hard (H), soft(S) or unavailable (NA) per frequency resource set among the at least one frequency resource set by the frequency domain HSNA information, wherein the subcarrier spacing information is related to a subcarrier spacing used as reference for a slot configuration, and wherein availability of soft resources for each frequency resource set group is provided for the IAB-DU.

10. The IAB node of claim 9,
wherein when the IAB node uses a simultaneous transmission and reception in the slot, the IAB-DU applies a configuration of hard (H), soft(S), or unavailable (NA) provided by the frequency domain HSNA information.

11. The IAB node of claim 9, wherein based on the symbol being configured as soft(S), the IAB-MT receives a time domain availability indication for the symbol through downlink control information (DCI).

12. The IAB node of claim 11, wherein based on a frequency resource being configured as soft(S), the IAB-MT receives a frequency domain availability indication for the frequency resource through the DCI.

13. The IAB node of claim 12, wherein one field of the DCI is related to both the time domain availability indication for the symbol and the frequency domain availability indication for the frequency resource.

14. A parent node comprising:
at least one transceiver;
at least one memory; and
at least one processor operably connectable to at least one transceiver and the at least one memory, wherein the at least one memory stores instructions that, based on being executed by the at least one processor, cause the at least one processor to perform operations comprising:

transmitting, to an integrated access and backhaul (IAB) node including an IAB-mobile terminal (IAB-MT) and an IAB-distributed unit (IAB-DU), information related to a resource configuration comprising time domain hard, soft, unavailable (HSNA) information, frequency domain HSNA information and subcarrier spacing information; and communicating with the IAB node based on the information related to the resource configuration, wherein a symbol in a slot is configured to be of hard (H), soft(S), or unavailable (NA) by the time domain HSNA information, wherein the frequency domain HSNA information provides an indication of hard (H), soft(S) or unavailable (NA) per frequency resource set among at least one frequency resource set configured to the IAB-DU, wherein the subcarrier spacing information is related to a subcarrier spacing used as reference for a slot configuration, and wherein availability of soft resources for each frequency resource set group is provided to the IAB-DU.

* * * * *